United States Patent [19]
Quirk

[11] Patent Number: 5,849,847
[45] Date of Patent: Dec. 15, 1998

[54] TELECHELIC POLYSTYRENE/POLYETHYLENE COPOLYMERS AND PROCESSES FOR MAKING SAME

[75] Inventor: Roderic P. Quirk, Akron, Ohio

[73] Assignee: FMC Corporation, Philadelphia, Pa.

[21] Appl. No.: 681,805

[22] Filed: Jul. 29, 1996

[51] Int. Cl.⁶ .............. C08F 297/02; C08F 4/46
[52] U.S. Cl. .......... 525/193; 525/88; 525/103; 525/106; 525/113; 525/120; 525/123; 525/131; 525/165; 525/177; 525/182; 525/184; 525/192; 525/196; 525/197; 525/240; 525/272; 525/280; 525/288; 525/291; 525/292; 525/301; 525/324; 525/372.1; 525/338; 525/342; 525/346; 525/354; 525/536; 525/359.2; 525/374; 525/375; 525/383; 525/385; 525/388; 526/173; 526/176; 526/178; 526/180; 526/181; 526/347; 526/352
[58] Field of Search ................. 526/347, 173, 526/176, 178, 180, 181, 352; 525/272, 250, 88, 193, 192, 196, 197, 240, 280, 288, 291, 292, 301, 324, 327.1, 103, 338, 342, 346, 354, 356, 359.2, 374, 375, 383, 385, 388, 106, 120, 131, 177, 184

[56] References Cited

U.S. PATENT DOCUMENTS

| | | |
|---|---|---|
| 3,250,862 | 7/1970 | Taniguchi et al. ............ 526/347 X |
| 3,280,084 | 10/1966 | Zelinski et al. . |
| 3,290,414 | 12/1966 | Anderson .................. 525/272 |
| 3,326,881 | 6/1967 | Uraneck et al. . |
| 3,639,517 | 2/1972 | Kitchen et al. . |
| 3,776,964 | 12/1973 | Morrison et al. . |
| 3,842,146 | 10/1974 | Milkovich et al. . |
| 3,862,100 | 1/1975 | Halasa et al. . |
| 3,954,894 | 5/1976 | Kamienski et al. . |
| 3,985,830 | 10/1976 | Fetters et al. . |
| 4,039,593 | 8/1977 | Kamienski et al. . |
| 4,668,746 | 5/1987 | Delaney et al. . |
| 4,994,526 | 2/1991 | Peters . |
| 5,310,490 | 5/1994 | Struglinski et al. . |
| 5,310,814 | 5/1994 | Struglinski et al. . |
| 5,331,058 | 7/1994 | Shepherd et al. . |
| 5,362,699 | 11/1994 | Shepherd et al. . |
| 5,376,745 | 12/1994 | Handlin, Jr. et al. . |
| 5,391,663 | 2/1995 | Bening et al. . |
| 5,393,843 | 2/1995 | Handlin, Jr. et al. . |
| 5,416,168 | 5/1995 | Willis et al. . |
| 5,478,899 | 12/1995 | Bening . |
| 5,486,568 | 1/1996 | Bening et al. . |

FOREIGN PATENT DOCUMENTS

| | | |
|---|---|---|
| 0 593 049 | 4/1994 | European Pat. Off. . |
| 0 632 075 | 1/1995 | European Pat. Off. . |
| 0011511 | 1/1983 | Japan .................. 526/347 |
| 2 241 239 | 8/1991 | United Kingdom . |
| 2 270 317 | 3/1994 | United Kingdom . |
| WO 91/12277 | 8/1991 | WIPO . |

OTHER PUBLICATIONS

D.N. Schulz et al., J. Poly. Sci. Polymer Chem. Ed. 12, 153–166 (1974).
M. Gardette et al., Tetrahedron 41, 5887–5899 (1985).
J. Almena, Tetrahedron 51, 11883–11890 (1995).
K. Endo et al., J. Chem. Soc., Chem. Commun., 1372–1373 (1990).
A.J. Dias et al., Rubber & Plastics News, pp. 18–20 (Oct. 31, 1988).
A.J. Dias et al., *Macromolecules* 20, 2068–2076 (1987).

*Primary Examiner*—Fred Teskin
*Attorney, Agent, or Firm*—Bell Seltzer Intellectual Property; Law Group of Alston & Bird LLP

[57] ABSTRACT

Polyalkenylaromatic-polyethylene copolymers are prepared using protected functional organolithium initiators. Polymerization of an alkenylsubstituted aromatic monomer followed by ethylene, results in a protected functional block polystyrene-co-polyethylenyllithium. Termination with a functionalizing agent followed by deprotection produces polymeric products with high functionalization at the initiating chain-end and at least partial functionalization at the terminal chain-end.

109 Claims, No Drawings

TELECHELIC POLYSTYRENE/POLYETHYLENE COPOLYMERS AND PROCESSES FOR MAKING SAME

CROSS-REFERENCE TO RELATED APPLICATIONS

This application is related to commonly owned copending Provisional application Ser. No. 60/001,895, filed Aug. 4, 1995, and claims the benefit of its earlier filing date under 35 U.S.C. 119(e).

FIELD OF THE INVENTION

This invention relates to novel polymers and processes for producing the same. More particularly, the invention relates novel polystyrene/polyethylene copolymers and processes for the anionic polymerization of the same.

BACKGROUND OF THE INVENTION

Living polymerizations can provide advantages over other polymerization techniques, such as well-defined polymer structures and low degrees of compositional heterogeneity. Many of the variables that affect polymer properties can be controlled, including molecular weight, molecular weight distribution, copolymer composition and microstructure, stereochemistry, branching and chain end functionality.

Living anionic polymerization of styrene and diene monomers was first described by Szwarc and his coworkers. See M. Szwarc, Nature 178, 1169 (1956) and M. Szwarc, et al., J.Am.Chem.Soc. 78, 2656 (1956). While living anionic polymerization can be effective for the controlled polymerization of various conjugated unsaturated compounds, such as dienes and alkenylsubstituted aromatic monomers, anionic polymerization of other types of monomers, and in particular olefins such as polyethylene, can be problematic.

Typically, ethylene is polymerized in a free radical initiated reaction with minimal control of the resultant polymer properties. Zieglar-Natta catalyzed polymerization can be used to provide stereoregular polyethylene. However, ethylene is not polymerizable using anionic mechanisms, and thus the ability to functionalize polyethylene is limited.

Block polystyrene/polyethylene copolymerization has been accomplished with polystyryllithium as the initiator, ethylene and N,N,N',N'-tetramethylethylenediamine (TMEDA), followed by termination with methanol. Endo and Otsu, Chem. Soc., Chem. Commun., 1990, 19, 1372. However, this process can result in various side reactions, including early chain termination resulting in olefinic chain ends; metalation of TMEDA resulting in polyethylene with nitrogen-containing chain-ends; chain transfer resulting in an early chain termination and a polystyryllithium-co-polyethylenyllithium.

Terminal functionalization has been achieved by reacting polystyrene-co-polyethylenyllithium as prepared above with functionalizing agents such as ethylene oxide, carbon dioxide, and 1-(4-dimethylaminophenyl)-1-phenylethylene or 3-(dimethylamino)propyl chloride (see R. P. Quirk and K. Han, Ph.D. thesis, University of Akron, 1995). This process results in polymers with a hydroxy, carboxylic acid or amino chain-end, respectively. The functionalization, however, was low (34 to 55%) due to the heterogeneity of the system and chain transfer to TMEDA. Therefore, it can be difficult to provide polymers with high functionality by this electrophilic terminating functionalization.

SUMMARY OF THE INVENTION

The present invention provides novel alkenylsubstituted aromatic/polyethylene copolymers, preferably polystyrene/polyethylene copolymers, including functionalized, telechelic, hetero-telechelic, and multi-branched and star copolymers, and processes for preparing the same. The novel polymers of the invention can have good functionalization, about 1 for mono-functional copolymers, and higher for telechelic copolymers. The novel copolymers of the invention have applications in a variety of areas, and are particularly useful as modifiers for polyolefin coatings, for example, to modify a surface of a polyolefin coating to render the surface receptive to printed indicia.

The present invention also provides processes for anionic copolymerization of alkenylsubstituted aromatic hydrocarbons and ethylene to produce the copolymers of the invention using protected functionalized initiators. Preferably, a modifier or promoter, and more preferably a di- or polydentate complexing agent, is also used to enhance the transmetallation reaction and thus the chain transfer reaction. A particularly preferred complexing agent is TMEDA.

In the process of the invention, an alkenylsubstituted aromatic monomer, such as styrene, is polymerized in the presence of the initiator to provide a living anion. A complexing agent and a second monomer, ethylene, is then added and copolymerized to form a living copolymer.

The resultant living copolymer can be quenched, for example with acidic methanol, to afford a protected copolymer with a functional group at the initiating chain end thereof. Removal of the protecting group results in a functionalized copolymer.

Alternatively, the resultant living anion can be quenched with various functionalizing agents, such as ethylene oxide, carbon dioxide, epichlorohydrin, and the like, to afford a mono-protected telechelic copolymer. The functional groups on the termini of the polymer can be the same (such as two hydroxyl groups) or different (such as one hydroxyl group and one amino group). The protecting group can be removed to provide copolymers with high functionalization at the initiating end (approaching or about 1) and at least partial functionalization at the terminal chain end.

Protected, functionalized star polymers can also prepared by coupling the living anion with known polyfunctional linking agents, such as silicon tetrachloride, tin tetrachloride, isomers of divinylbenzene, and the like. Subsequent deprotection affords functionalized stars.

In contrast to star polymers of the prior art, the molecular architecture of compounds of the present invention can be precisely controlled. For example, each arm of the multi-arm polymer can contain a functional group (protected or non-protected), and the functional groups (and/or protecting groups) can be the same or different through use of mixtures of initiators with different protected functionalities to initiate polymerization. The star polymers can also include both functional and non-functional ends by using combinations of protected functional initiators and alkyllithium initiators to initiate polymerization. The nature of the functional group, and/or protecting group, and/or non-functional group, can be varied simply by changing the initiator, and the ratio of one functional group to another functional group, or of one functional group to a non-functional group, can be adjusted by simply varying the ratio of initiators to one another. Further, monomer identity, monomer composition and molecular weight of both functional and non-functional arms can be independently manipulated by varying the monomer charged by each initiator. Still further, the number of polymer arms can be adjusted by varying the nature of the coupling agent, and the ratio of living polymer to the coupling agent.

DETAILED DESCRIPTION OF THE INVENTION

Preferred copolymers of the present invention can be represented generally by following formula:

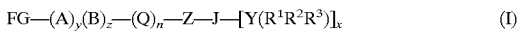

FG—$(A)_y$—$(B)_z$—$(Q)_n$—Z—J—$[Y(R^1R^2R^3)]_x$  (I)

wherein FG is H or a protected or non-protected functional group; each A and B is a saturated or unsaturated hydrocarbyl group, one of which is derived by incorporation of an alkenylsubstituted aromatic hydrocarbon, and the other of which is derived by incorporation of ethylene; y and z represent the equivalents of A and B employed, respectively, and are integers from 10 to 200; Q is a saturated or unsaturated hydrocarbyl group derived by incorporation of a compound selected from the group consisting of conjugated diene hydrocarbons, alkenylsubstituted aromatic hydrocarbons, and mixtures thereof; n is an integer from 0 to 5; Z is a branched or straight chain hydrocarbon group which contains 3–25 carbon atoms, optionally containing aryl or substituted aryl groups; J is oxygen, sulfur, or nitrogen; $[Y(R^1R^2R^3)]_x$ is a protecting group, in which Y is an element selected from Group IVa of the Periodic Table of Elements; $R^1$, $R^2$, and $R^3$ are each independently selected from the group consisting of hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen.

Removal of the protecting group (deprotection) produces polymers with oxygen, sulfur or nitrogen functional groups on the ends of the polymers. The residual aliphatic unsaturation can be optionally removed by hydrogenation before or after removal of the protecting groups. These functional groups can then participate in various copolymerization reactions by reaction of the functional groups on the ends of the polymer with selected difunctional or polyfunctional comonomers and/or linking or coupling agents, as described in more detail below.

The alkenylsubstituted aromatic hydrocarbon is chosen from the group of unsaturated organic compounds that can be polymerized anionically (i.e. in a reaction initiated by an organo-alkali metal). Examples of polymerizable alkenyl-substituted aromatic hydrocarbons include, but are not limited to, styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene and mixtures of these, as well as alkyl, cycloalkyl, aryl, alkylaryl and arylalkyl derivatives thereof in which the total number of carbon atoms in the combined hydrocarbon constituents is generally not greater than 18. Examples of these latter compounds include 3-methylstyrene, 3,5-diethylstyrene, 4-tert-butylstyrene, 2-ethyl-4-benzylstyrene, 4-phenylstyrene, 4-p-tolylstyrene, 2,4-divinyltoluene and 4,5-dimethyl-1-vinylnaphthalene. U.S. Pat. No. 3,377,404, incorporated herein by reference in its entirety, discloses suitable additional alkenylsubstituted aromatic compounds.

The process of the invention generally comprises initiating polymerization of an alkenylsubstituted aromatic hydrocarbon as described above in a polar, hydrocarbon, or mixed hydrocarbon-polar solvent medium, with a protected functional organolithium initiator to form an intermediate mono-protected mono-functional living anion. Polymerization may be conducted at a temperature of −30° C. to 150° C. Ethylene monomer and an appropriate modifier, i.e., a di- or polydentate complexing agent, is added to the living anion, and copolymerized therewith to afford a mono-protected mono-functional living block copolymer. Exemplary complexing agents include, but are not limited to, N,N,N',N'-tetramethylethylenediamine (TMEDA), 1,4-diazabicyclo [2.2.2]octane (DABCO), heterocyclic cryptands, and the like. The copolymerization reaction can proceed at a temperature of about 0° C. to about 100° C., preferably about 50° C.

The mono-protected mono-functional living copolymer can be quenched or terminated, for example by addition of a suitable proton donor, such as water, methanol, isopropanol, acetic acid, and the like, to provide a mono-functional copolymer. Alternatively, polymerization can be followed by functionalization of the resultant living anion with a suitable electrophile to provide a mono-protected, di-functional polymer. The di-functional copolymer may be telechelic, i.e., contain two functional groups, which are the same, per molecule at the termini of the polymer. The copolymer can also be hetero-telechelic, having different functionalities at opposite ends of the polymer chain. This is represented schematically by the formula A—B, wherein A and B are different functional groups.

Electrophiles that are useful in functionalizing the polymeric living copolymer include, but are not limited to, alkylene oxides, such as ethylene oxide, propylene oxide, styrene oxide, and oxetane; oxygen; sulfur; carbon dioxide; halogens such as chlorine, bromine and iodine; alkenylhalosilanes, omega-alkenylarylhalosilanes, and haloalkyltrialkoxysilanes, such as chlorotrimethylsilane and styrenyldimethyl chlorosilane; sulfonated compounds, such as 1,3-propane sultone; amides, including cyclic amides, such as caprolactam, N-benzylidene trimethylsilylamide, and dimethyl formamide; silicon acetals; 1,5-diazabicyclo [3.1.0]hexane; allyl halides, such as allyl bromide and allyl chloride; methacryloyl chloride; amines, including primary, secondary, tertiary and cyclic amines, such as 3-(dimethylamino)-propyl chloride and N-(benzylidene) trimethylsilylamine; epihalohydrins, such as epichlorohydrin, epibromohydrin, and epiiodohydrin, and other materials as known in the art to be useful for terminating or end capping polymers. These and other useful functionalizing agents are described, for example, in U.S. Pat. Nos. 3,786,116 and 4,409,357, the entire disclosure of each of which is incorporated herein by reference. The copolymer optionally is hydrogenated, either before after removal of the protecting group.

Exemplary organolithium initiators useful in the present invention include initiators selected from the group consisting of omega-(tert-alkoxy)-1-alkyllithiums, omega-(tert-alkoxy)-1-alkyllithiums chain extended with conjugated alkadienes, alkenylsubstituted aromatic hydrocarbons, and mixtures thereof, omega-(tert-alkylthio)-1-alkyllithiums, omega-(tert-alkylthio)-1-alkyllithiums chain extended with conjugated alkadienes, alkenylsubstituted aromatic hydrocarbons, and mixtures thereof, omega-(tert-butyldimethylsilyloxy)-1-alkyllithiums, omega-(tert-butyldimethylsilylthio)-1-alkyllithiums, omega-(dialkylamino)-1-alkyllithiums, omega-(dialkylamino)-1-alkyllithiums chain-extended with conjugated alkadienes, alkenylsubstituted aromatic hydrocarbons, and mixtures thereof, and omega-(bis-tert-alkylsilylamino)-1-alkyllithiums.

Initiators useful in the preparation of polymers of the present invention are also represented by the following formula:

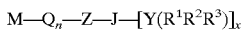  (II)

wherein M is an alkali metal, Q is a saturated or unsaturated hydrocarbyl group derived by incorporation of a compound selected from the group consisting of conjugated diene hydrocarbons, alkenylsubstituted aromatic hydrocarbons, and mixtures thereof; n is an integer from 0 to 5; Z is a branched or straight chain hydrocarbon group which contains 3–25 carbon atoms, optionally containing aryl or substituted aryl groups; J is a hetero atom, e.g., oxygen, sulfur, or nitrogen; Y is an element selected from Group IVa of the Periodic Table of Elements; $R^1$, $R^2$, and $R^3$ are each independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen.

These initiators (II) can be prepared by reaction of protected organolithium compounds of the following formula:

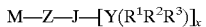  (III)

wherein each of M, Z, J, Y, $R^1$, $R^2$, $R^3$, and x are the same as defined above, with conjugated alkadienes (such as butadiene or isoprene), alkenylsubstituted aromatic hydrocarbons (such as styrene or alpha-methylstyrene), and mixtures thereof to form an extended hydrocarbon chain between M and Z in Formula (III), denoted as $Q_n$ in Formula (II).

The compounds of Formula (III) are prepared by first reacting in an inert solvent a selected tertiary amino-1-haloalkane, omega-hydroxy-protected-1-haloalkane, or omega-thio-protected-1-haloalkane, depending on whether J is to be N, O or S, (the alkyl portions of the haloalkyl groups contain 3 to 25 carbon atoms) with an alkali metal, preferably lithium, at a temperature between about 35° C. and about 130° C., preferably at the solvent reflux temperature, to form a protected monofunctional alkali metal initiator (of Formula III), which is then optionally reacted with a one or more conjugated diene hydrocarbons, one or more alkenyl-substituted aromatic hydrocarbons, or mixtures of one or more dienes with one or more alkenylsubstituted aromatic hydrocarbons, in a predominantly alkane, cycloalkane, or aromatic reaction solvent, which solvent contains 5 to 10 carbon atoms, and mixtures of such solvents to produce a monofunctional initiator with an extended chain or tether between the metal atom (M) and element (J) in Formula (II) above and mixtures thereof with compounds of Formula (III). Q in Formula (II) is preferably derived from conjugated 1,3-dienes. While Y in the protecting group [Y($R^1R^2R^3$)] of the formulae above can be any of the elements in Group IVa of the Periodic Table of the Elements, carbon and silicon currently appear the most useful, especially when polymerizing conjugated dienes.

Incorporation of Q groups into the M—Z linkage to form the compounds of Formula (II) above involves addition of compounds of the Formula

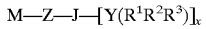

where the symbols have the meanings ascribed above, across the carbon to carbon double bonds in compounds selected from the consisting of one or more conjugated diene hydrocarbons, one or more alkenylsubstituted aromatic hydrocarbons, or mixtures of one or more dienes with one or more alkenylsubstituted aromatic hydrocarbons, to produce new carbon-lithium bonds of an allylic or benzylic nature, much like those found in a propagating polyalkadiene or polyarylethylene polymer chain derived by anionic initiation of the polymerization of conjugated dienes or arylethylenes. These new carbon-lithium bonds are now activated toward polymerization and so are much more efficient in promoting polymerization than the precursor M—Z (M=Li) bonds, themselves.

Tertiary amino-1-haloalkanes useful in practicing this invention include compounds of the following general structures:

and

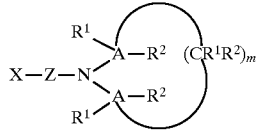

wherein X is halogen, preferably chlorine or bromine; Z is a branched or straight chain hydrocarbon tether or connecting group which contains 3–25 carbon atoms, which tether may also contain aryl or substituted aryl groups; A is an element selected from Group IVa of the Periodic Table of the Elements; $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms; and m is an integer from 1 to 7, and their employment as initiators in the anionic polymerization of olefin containing monomers in an inert, hydrocarbon solvent optionally containing a Lewis base. The process reacts selected tertiary amino-1-haloalkanes whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the tertiary amine initiators are conducted in an inert solvent, preferably a non-polar solvent, using an olefinic monomer which is an alkenylsubstituted aromatic hydrocarbon at a temperature of about 0° C. to about 100° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

Tertiary amino-1-haloalkanes useful in the practice of this invention include, but are not limited to, 3-(N,N-dimethylamino)-1-propyl halide, 3-(N,N-dimethylamino)-2-methyl-1-propyl halide, 3-(N,N-dimethylamino)-2,2-dimethyl-1-propyl halide, 4-(N,N-dimethylamino)-1-butyl halide, 5-(N,N-dimethylamino)-1-pentyl halide, 6-(N,N-dimethylamino)-1-hexyl halide, 3-(N,N-diethylamino)-1-propyl halide, 3-(N,N-diethylamino)-2-methyl-1-propyl halide, 3-(N,N-diethylamino)-2,2-dimethyl-1-propyl halide, 4-(N,N-diethylamino)-1-butyl halide, 5-(N,N-diethylamino)-1-pentyl halide, 6-(N,N-diethylamino)-1-hexyl halide, 3-(N-ethyl-N-methylamino)-1-propyl halide, 3-(N-ethyl-N-methylamino)-2-methyl-1-propyl halide, 3-(N-ethyl-N-methylamino)-2,2-dimethyl-1-propyl halide, 4-(N-ethyl-N-methylamino)-1-butyl halide, 5-(N-ethyl-N-methylamino)-

1-pentyl halide, 6-(N-ethyl-N-methylamino)-1-hexyl halide, 3-(piperidino)-1-propyl halide, 3-(piperidino)-2-methyl-1-propyl halide, 3-(piperidino)-2,2-dimethyl-1-propyl halide, 4-(piperidino)-1-butyl halide, 5-(piperidino)-1-pentyl halide, 6-(piperidino)-1-hexyl halide, 3-(pyrrolidino)-1-propyl halide, 3-(pyrrolidino)-2-methyl-1-propyl halide, 3-(pyrrolidino)-2,2-dimethyl-1-propyl halide, 4-(pyrrolidino)-1-butyl halide, 5-(pyrrolidino)-1-pentyl halide, 6-(pyrrolidino)-1-hexyl halide, 3-(hexamethyleneimino)-1-propyl halide, 3-(hexamethyleneimino)-2-methyl-1-propyl halide, 3-(hexamethyleneimino)-2,2-dimethyl-1-propyl halide, 4-(hexamethyleneimino)-1-butyl halide, 5-(hexamethyleneimino)-1-pentyl halide, 6-(hexamethyleneimino)-1-hexyl halide, 3-(N-isopropyl-N-methyl)-1-propyl halide, 2-(N-isopropyl-N-methyl)-2-methyl-1-propyl halide, 3-(N-isopropyl-N-methyl)-2,2-dimethyl-1-propyl halide, and 4-(N-isopropyl-N-methyl)-1-butyl halide. The halo- or halide group is preferably selected from chlorine and bromine.

Omega-hydroxy-protected-1-haloalkanes useful in producing monofunctional ether initiators useful in practicing this invention have the following general structure:

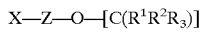

wherein X is halogen, preferably chlorine or bromine; Z is a branched or straight chain hydrocarbon group which contains 3–25 carbon atoms, optionally containing aryl or substituted aryl groups; and $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and their employment as initiators in the anionic polymerization of olefin containing monomers in an inert, hydrocarbon solvent optionally containing a Lewis base. The process reacts selected omega-hydroxy-protected-1-haloalkanes whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the monofunctional ether initiators are conducted in an inert solvent, preferably a non-polar solvent, using an olefinic monomer which is an alkenylsubstituted aromatic hydrocarbon at a temperature of about 0° C. to about 100° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

The precursor omega-protected-1-haloalkanes (halides) can be prepared from the corresponding haloalcohol by standard literature methods. For example, 3-(1,1-dimethylethoxy)-1-chloropropane can be synthesized by the reaction of 3-chloro-1-propanol with 2-methylpropene according to the method of A. Alexakis, M. Gardette, and S. Colin, Tetrahedron Letters, 29, 1988, 2951. The method of B. Figadere, X. Franck and A. Cave, Tetrahedron Letters, 34, 1993, 5893, which involves the reaction of the appropriate alcohol with 2-methyl-2-butene catalyzed by boron trifluoride etherate, can be employed for the preparation of the t-amyl ethers. The alkoxy, alkylthio or dialkylamino substituted ethers, for example 6-[3-(methylthio)-1-propyloxy]-1-chlorohexane, can be synthesized by reaction of the corresponding substituted alcohol, for instance 3-methylthio-1-propanol, with an alpha-bromo-omega-chloroalkane, for instance 1-bromo-6-hexane, according to the method of J. Almena, F. Foubelo and M. Yus, Tetrahedron, 51, 1995, 11883. The compound 4-(methoxy)-1-chlorobutane, and the higher analogs, can be synthesized by the ring opening reaction of tetrahydrofuran with thionyl chloride and methanol, according to the procedure of T. Ferrari and P. Vogel, SYNLETT, 1991, 233. The triphenylmethyl protected compounds, for example 3-(triphenylmethoxy)-1-chloropropane, can be prepared by the reaction of the haloalcohol with triphenylmethylchloride, according to the method of S. K. Chaudhary and O. Hernandez, Tetrahedron Letters, 1979, 95.

Omega-hydroxy-protected-1-haloalkanes prepared in accordance with this earlier process useful in practicing this invention include, but are not limited to, 3-(1,1-dimethylethoxy)-1-propyl halide, 3-(1,1-dimethylethoxy)-2-methyl-1-propyl halide, 3-(1,1-dimethylethoxy)-2,2-dimethyl-1-propyl halide, 4-(1,1-dimethylethoxy)-1-butyl halide, 5-(1,1-dimethylethoxy)-1-pentyl halide, 6-(1,1-dimethylethoxy)-1-hexyl halide, 8-(1,1-dimethylethoxy)-1-octyl halide, 3-(1,1-dimethylpropoxy)-1-propyl halide, 3-(1,1-dimethylpropoxy)-2-methyl-1-propyl halide, 3-(1,1-dimethylpropoxy)-2,2-dimethyl-1-propyl halide, 4-(1,1-dimethylpropoxy)-1-butyl halide, 5-(1,1-dimethylpropoxy)-1-pentyl halide, 6-(1,1-dimethylpropoxy)-1-hexyl halide, 8-(1,1-dimethylpropoxy)-1-octyl halide, 4-(methoxy)-1-butyl halide, 4-(ethoxy)-1-butyl halide, 4-(propyloxy)-1-butyl halide, 4-(1-methylethoxy)-1-butyl halide, 3-(triphenylmethoxy)-2,2-dimethyl-1-propyl halide, 4-(triphenylmethoxy)-1-butyl halide, 3-[3-(dimethylamino)-1-propyloxy]-1-propyl halide, 3-[2-(dimethylamino)-1-ethoxy]-1-propyl halide, 3-[2-(diethylamino)-1-ethoxy]-1-propyl halide, 3-[2-(diisopropyl)amino]-1-ethoxy]-1-propyl halide, 3-[2-(1-piperidino)-1-ethoxy]-1-propyl halide, 3-[2-(1-pyrrolidino)-1-ethoxy]-1-propyl halide, 4-[3-(dimethylamino)-1-propyloxy]-1-butyl halide, 6-[2-(1-piperidino)-1-ethoxy]-1-hexyl halide, 3-[2-(methoxy)-1-ethoxy]-1-propyl halide, 3-[2-(ethoxy)-1-ethoxy]-1-propyl halide, 4-[2-(methoxy)-1-ethoxy]-1-butyl halide, 5-[2-(ethoxy)-1-ethoxy]-1-pentyl halide, 3-[3-(methylthio)-1-propyloxy]-1-propyl halide, 3-[4-(methylthio)-1-butyloxy]-1-propyl halide, 3-(methylthiomethoxy)-1-propyl halide, 6-[3-(methylthio)-1-propyloxy]-1-hexyl halide, 3-[4-(methoxy)-benzyloxy]-1-propyl halide, 3-[4-(1,1-dimethylethoxy)-benzyloxy]-1-propyl halide, 3-[2,4-(dimethoxy)-benzyloxy]-1-propyl halide, 8-[4-(methoxy)-benzyloxy]-1-octyl halide, 4-[4-(methylthio)-benzyloxy]-1-butyl halide, 3-[4-(dimethylamino)-benzyloxy]-1-propyl halide, 6-[4-(dimethylamino)-benzyloxy]-1-hexyl halide, 5-(triphenylmethoxy)-1-pentyl halide, 6-(triphenylmethoxy)-1-hexyl halide, and 8-(triphenylmethoxy)-1-octyl halide. The halo- or halide group is preferably selected from chlorine and bromine.

U.S. Pat. No. 5,362,699 discloses a process for the preparation of hydrocarbon solutions of monofunctional ether initiators derived from omega-hydroxy-silyl-protected-1-haloalkanes of the following general structure:

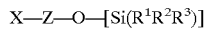

wherein X is halogen, preferably chlorine or bromine; Z is a branched or straight chain hydrocarbon group which contains 3–25 carbon atoms, optionally containing aryl or substituted aryl groups; and $R^1$, $R^2$, and $R^3$ are independently defined as saturated and unsaturated aliphatic and aromatic radicals, and their employment s initiators in the anionic polymerization of olefin containing monomers in an inert, hydrocarbon solvent optionally containing a Lewis base. The process reacts selected omega-hydroxy-protected-1-haloalkanes whose alkyl groups contain 3 to 25 carbon atoms, with lithium metal at a temperature between about 25° C. and about 40° C., in an alkane or cycloalkane reaction solvent containing 5 to 10 carbon atoms and mixtures of such solvents.

Anionic polymerizations employing the monofunctional siloxy ether initiators are conducted in an inert solvent, preferably a non-polar solvent, using an olefinic monomer which is an alkenylsubstituted aromatic hydrocarbon at a temperature of about 0° C. to about 100° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

Omega-silyl-protected-1-haloalkanes prepared in accordance with this earlier process useful in practicing this invention include, but are not limited to, 3-(t-butyldimethylsilyloxy)-1-propyl halide, 3-(t-butyldimethylsilyloxy)-2-methyl-1-propyl halide, 3-(t-butyldimethylsilyloxy)-2,2-dimethyl-1-propyl halide, 4-(t-butyldimethylsilyloxy)-1-butyl halide, 5-(t-butyldimethylsilyloxy)-1-pentyl halide, 6-(t-butyldimethylsilyloxy)-1-hexyl halide, 8-(t-butyldimethylsilyloxy)-1-octyl halide, 3-(t-butyldiphenylylsilyloxy)-1-propyl halide, 3-(t-butyldiphenylylsilyloxy)-2-methyl-1-propyl halide, 3-(t-butyldiphenylylsilyloxy)-2,2-dimethyl-1-propyl halide, 4-(t-butyldiphenylylsilyloxy)-1-butyl halide, 6-(t-butyldiphenylsilyloxy)-1-hexyl halide and 3-(trimethylsilyloxy)-2,2-dimethyl-1-propyl halide. The halo- or halide group is preferably selected from chlorine and bromine.

Monofunctional thioether initiators useful in the practice of this invention can be derived from omega-thio-protected-1-haloalkanes of the following general structure:

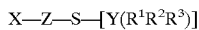

wherein X is halogen, preferably chlorine or bromine; Z is a branched or straight chain hydrocarbon group which contains 3–25 carbon atoms, optionally containing aryl or substituted aryl groups; [Y($R^1R^2R^3$)] is a protecting group in which Y is an element selected from Group IVa of the Periodic Table of the Elements, and $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and their employment as initiators in the anionic polymerization of olefin containing monomers in an inert, hydrocarbon solvent optionally containing a Lewis base. The process reacts selected omega-thioprotected-1-haloalkyls whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the monofunctional thioether initiators are conducted in an inert solvent, preferably a non-polar solvent, using an olefinic monomer which is an alkenylsubstituted aromatic hydrocarbon at a temperature of about 0° C. to about 100° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

The initiator precursor, omega-thio-protected-1-haloalkanes (halides), can be prepared from the corresponding halothiol by standard literature methods. For example, 3-(1,1-dimethylethylthio)-1-propylchloride can be synthesized by the reaction of 3-chloro-1-propanthiol with 2-methylpropene according to the method of A. Alexakis, M. Gardette, and S. Colin, Tetrahedron Letters, 29, 1988, 2951. Alternatively, reaction of 1,1-dimethylethylthiol with 1-bromo-3-chloropropane and a base affords 3-(1,1-dimethylethylthio)-1-propylchloride. The method of B. Figadere, X. Franck and A. Cave, Tetrahedron Letters, 34, 1993, 5893, which involves the reaction of the appropriate thiol with 2-methyl-2-butene catalyzed by boron trifluoride etherate, can be employed for the preparation of the t-amyl ethers. Additionally, 5-(cyclohexylthio)-1-pentylhalide and the like, can be prepared by the method of J. Almena, F. Foubelo, and M. Yus, Tetrahedron, 51, 1995, 11883. This synthesis involves the reaction of the appropriate thiol with an alkyllithium, then reaction of the lithium salt with the corresponding alpha, omega dihalide. 3-(Methylthio)-1-propylchloride can be prepared by chlorination of the corresponding alcohol with thionyl chloride, as taught by D. F. Taber and Y. Wang, J. Org, Chem., 58, 1993, 6470. Methoxymethylthio compounds, such as 6-(methoxymethylthio)-1-hexylchloride, can be prepared by the reaction of the omega-chloro-thiol with bromochloromethane, methanol, and potassium hydroxide, by the method of F. D. Toste and I. W. J. Still, Synlett, 1995, 159. T-Butyldimethylsilyl protected compounds, for example 4-(t-butyldimethylsilylthio)-1-butylhalide, can be prepared from t-butyldimethylchlorosilane, and the corresponding thiol, according to the method described in U.S. Pat. No. 5,493,044.

Omega-thio-protected 1-haloalkanes prepared in accordance with this earlier process useful in practicing this invention include, but are not limited to, 3-(methylthio)-1-propylhalide, 3-(methylthio)-2-methyl-1-propylhalide, 3-(methylthio)-2,2-dimethyl-1-propylhalide, 4-(methylthio)-1-butylhalide, 5-(methylthio)-1-pentylhalide, 6-(methylthio)-1-hexylhalide, 8-(methylthio)-1-octylhalide, 3-(methoxymethylthio)-1-propylhalide, 3-(methoxymethylthio)-2-methyl-1-propylhalide, 3-(methoxymethylthio)-2,2-dimethyl-1-propylhalide, 4-(methoxymethylthio)-1-butylhalide, 5-(methoxymethylthio)-1-pentylhalide, 6-(methoxymethylthio)-1-hexylhalide, 8-(methoxymethylthio)-1-octylhalide, 3-(1,1-dimethylethylthio)-1-propylhalide, 3-(1,1-dimethylethylthio)-2-methyl-1-propylhalide, 3-(1,1-dimethylethylthio)-2,2-dimethyl-1-propylhalide, 4-(1,1-dimethylethylthio)-1-butylhalide, 5-(1,1-dimethylethylthio)-1-pentylhalide, 6-(1,1-dimethylethylthio)-1-hexylhalide, 8-(1,1-dimethylethylthio)-1-octylhalide, 3-(1,1-dimethylpropylthio)-1-propylhalide, 3-(1,1-dimethylpropylthio)-2-methyl-1-propylhalide, 3-(1,1-dimethylpropylthio)-2,2-dimethyl-1-propylhalide, 4-(1,1-dimethylpropylthio)-1-butylhalide, 5-(1,1- dimethylpropylthio)-1-pentylhalide, 6-(1,1-dimethylpropylthio)-1-hexylhalide, 8-(1,1-dimethylpropylthio)-1-octylhalide, 3-(cyclopentylthio)-1-propylhalide, 3-(cyclopentylthio)-2-methyl- 1-propylhalide, 3-(cyclopentylthio)-2,2-dimethyl-1-propylhalide, 4-(cyclopentylthio)-1-butylhalide, 5-(cyclopentylthio)-1-pentylhalide, 6-(cyclopentylthio)-1-hexylhalide, 8-(cyclopentylthio)-1-octylhalide, 3-(cyclohexylthio)-1-propylhalide, 3-(cyclohexylthio)-2-methyl-1-propylhalide, 3-(cyclohexylthio)-2,2-dimethyl-1-propylhalide, 4-(cyclohexylthio)-1-butylhalide, 5-(cyclohexylthio)-1-pentylhalide, 6-(cyclohexylthio)-1-hexylhalide, 8-(cyclohexylthio)-1-octylhalide, 3-(t-butyldimethylsilylthio)-1-propylhalide, 3-(t-butyldimethylsilylthio)-2-methyl-1-propylhalide, 3-(t-butyldimethylsilylthio)-2,2-dimethyl-1-propylhalide, 3-(t-butyldimethylsilylthio)-2-methyl-1-propylhalide, 4-(t-butyldimethylsilylthio)-1-butylhalide, 6-(t-butyldimethylsilylthio)-1-hexylhalide and 3-(trimethylsilylthio)-2,2-dimethyl-1-propylhalide. The halo- or halide group is preferably selected from chlorine and bromine.

Examples of functionalized organolithium initiators include, but are not limited to, tert-alkoxy-alkyllithiums such as 3-(1,1-dimethylethoxy)-1-propyllithium and its more hydrocarbon-soluble isoprene chain-extended oligomeric analog (n=2), 3-(tert-butyldimethylsilyloxy)-1-propyllithium (n=0), tert-alkylthio-alkyllithiums such as 3-(1,1-dimethylethylthio)-1-propyllithium and its more hydrocarbon-soluble isoprene chain-extended oligomeric analog (n=2), 3-(dimethylamino)-1-propyllithium and its more hydrocarbon-soluble isoprene chain-extended oligomeric analog (n=2) and 3-(di-tert-butyldimethylsilylamino) -1-propyllithium, and mixtures thereof. Further examples of protected functionalized initiators that may be employed in this invention include, but are not limited to, 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-( 1,1-dimethylethoxy)-1-butyllithium, 5-(1,1-dimethylethoxy)-1-pentyllithium, 6-(1, 1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy) -1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium, 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 4-(ethoxy)-1-butyllithium, 4-(propyloxy)-1-butyllithium, 4-(1-methylethoxy)-1-butyllithium, 3-(triphenylmethoxy)-2,2-dimethyl-1-propyllithium, 4-(triphenylmethoxy)-1-butyllithium, 3-[3-(dimethylamino)-1-propyloxy]-1-propyllithium, 3-[2-(dimethylamino)-1-ethoxy]-1-propyllithium, 3-[2-(diethylamino)-1-ethoxy]-1-propyllithium, 3-[2-(diisopropyl)amino]-1-ethoxy]-1-propyllithium, 3-[2-(1-piperidino)-1-ethoxy]-1-propyllithium, 3-[2-(1-pyrrolidino)-1-ethoxy]-1-propyllithium, 4-[3-(dimethylamino)-1-propyloxy]-1-butyllithium, 6-[2-(1-piperidino)-1-ethoxy]-1-hexyllithium, 3-[2-(methoxy)-1-ethoxy]-1-propyllithium, 3-[2-(ethoxy)-1-ethoxy]-1-propyllithium, 4-[2-(methoxy)-1-ethoxy]-1-butyllithium, 5-[2-(ethoxy)-1-ethoxy]-1-pentyllithium, 3-[3-(methylthio)-1-propyloxy]-1-propyllithium, 3-[4-(methylthio)-1-butyloxy]-1-propyllithium, 3-(methylthiomethoxy)-1-propyllithium, 6-[3-(methylthio)-1-propyloxy]-1-hexyllithium, 3-[4-(methoxy)-benzyloxy]-1-propyllithium, 3-[4-(1,1-dimethylethoxy)-benzyloxy]-1-propyllithium, 3-[2,4-(dimethoxy)-benzyloxy]-1-propyllithium, 8-[4-(methoxy)-benzyloxy]-1-octyllithium, 4-[4-(methylthio)-benzyloxy]-1-butyllithium, 3-[4-(dimethylamino)-benzyloxy]-1-propyllithium, 6-[4-(dimethylamino)-benzyloxy]-1-hexyllithium, 5-(triphenylmethoxy)-1-pentyllithium, 6-(triphenylmethoxy)-1-hexyllithium, and 8-(triphenylmethoxy)-1-octyllithium, 3-(hexamethyleneimino)-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium, 6-(t-butyldimethylsilylthio)-1-hexyllithium, 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-( 1,1-dimethylpropylthio)-1-hexyllithium, and 8-(1,1-dimethylpropylthio)-1-octyllithium and their more hydrocarbon soluble conjugated alkadiene, alkenylsubstituted aromatic hydrocarbon, and mixtures thereof, chain extended oligomeric analogs (n=1–5).

Functionalized polymers of Formula (I) can be further reacted with other comonomers, such as di- or polyesters, di- or polyiisocyanates, di-, poly-, or cyclic amides, di- and polycarboxylic acids, and di- and polyols, in the presence of a strong acid catalyst to simultaneously deprotect the functional copolymer and polymerize both functional ends thereof to produce novel segmented block polymers. Alternatively, telechelic copolymers of Formula (I) can be reacted with other comonomers in the absence of a strong acid catalyst to yield block copolymers, while maintaining the integrity of the protective group to provide a functional block copolymer. Still another alternative is to remove the protective group of the functional copolymer of Formula (I) and to polymerize a functional block copolymer of the preceding sentence with the same or other comonomers to produce novel segmented block polymers.

The polymerization solvent is preferably an inert solvent such as a hydrocarbon. Solvents useful in practicing this invention include, but are not limited to, inert liquid alkanes, cycloalkanes and aromatic solvents such as alkanes and cycloalkanes containing five to ten carbon atoms, such as pentane, hexane, cyclohexane, methylcyclohexane, heptane, methylcycloheptane, octane, decane and the like, and aromatic solvents containing six to ten carbon atoms such as toluene, ethylbenzene, p-xylene, m-xylene, o-xylene, n-propylbenzene, isopropylbenzene, n-butylbenzene, and the like.

Polar solvents (modifiers) can be added to the polymerization reaction to promote functionalization. Examples of polar modifiers include, but are not limited to, diethyl ether, dibutyl ether, tetrahydrofuran, 2-methyltetrahydrofuran, methyl tert-butyl ether, diazabicyclo[2.2.2]octane, triethylamine, tributylamine, N,N,N',N'-tetramethylethylene diamine (TMEDA), and 1,2-dimethoxyethane (glyme). The amount of the polar modifier added depends, for example, on the identity of the functionalizing agent.

As noted above, if desired, the protecting groups can be removed from the copolymer. This deprotection can be performed either prior to or after the optional hydrogenation of the residual aliphatic unsaturation. For example, to remove tert-alkyl-protected groups, the protected polymer can be mixed with Amberlyst® 15 ion exchange resin and heated at an elevated temperature, for example 150° C., until deprotection is complete. Tert-alkyl-protected groups can also be removed by reaction of the polymer with para-toluensulfonic acid, trifluoroacetic acid, or trimethylsilyliodide. Additional methods of deprotection of the tert-alkyl protecting groups can be found in T. W. Greene and P. G. M. Wuts, Protective Groups in Organic Synthesis, Second Edition, Wiley, New York, 1991, page 41.

Tert-butyldimethylsilyl protecting groups can be removed by treatment of the copolymer with acid, such as hydrochloric acid, acetic acid, para-toluensulfonic acid, or Dowex® 50W-X8. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80–83.

In addition, protecting groups can be selectively removed from the polymer, i.e., deprotecting conditions can be selected so as to remove at least one protecting group without removing other dissimilar protecting groups, by proper selection of deprotecting reagents and conditions.

The following table details representative experimental conditions capable of selectively removing protecting groups (more labile) while maintaining the integrity of other different protecting groups (more stable).

| Labile | Stable | Conditions |
| --- | --- | --- |
| t-butyldimethylsilyl | t-butyl | tetrabutylammonium fluoride |
| t-butyldimethylsilyl | t-butyl | 1 N HCL |
| t-butyldimethylsilyl | dialkylamino | tetrabutylammonium fluoride |
| t-butyldimethylsilyl | dialkylamino | 1 N HCL |
| t-butyl | dialkylamino | Amberlyst ® resin |
| t-amyl | dialkylamino | Amberlyst ® resin |
| trimethylsilyl | t-butyl | tetrabutylammonium fluoride |
| trimethylsilyl | t-butyl | 1 N HCl |
| trimethylsilyl | dialkylamino | tetrabutylammonium fluoride |
| trimethylsilyl | dialkylamino | 1 N HCl |

The progress of the deprotection reactions can be monitored by conventional analytical techniques, such as Thin Layer Chromatography (TLC), Nuclear Magnetic Resonance (NMR) spectroscopy, or InfraRed (IR) spectroscopy.

Examples of methods to hydrogenate the copolymers of this invention are described in U.S. Pat. Nos. 4,970,254, 5,166,277, 5,393,843 and 5,496,898, the entire disclosure of each of which is incorporated by reference. The hydrogenation of the copolymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nuclear Magnetic Resonance (NMR) spectroscopy. The hydrogenation reaction is conducted until at least 90% of the aliphatic unsaturation has been saturated. The hydrogenated copolymer is then recovered by conventional procedures, such as removal of the catalyst with aqueous acid wash, followed by solvent removal or precipitation of the copolymer.

In another aspect of the invention, multi-branched or star-shaped polymers which include ethylene and/or alkenylsubstituted aromatic hydrocarbons are also provided, including multi-branched or star-shaped polymers with protected functional groups, their optionally hydrogenated analogues, and the polymers produced by removal of the protecting groups. The star polymers in this aspect of the invention can be produced using the functional initiators (II) described above (singly or combinations thereof), which, by design, incorporate the versatility of functional branch end star polymers. For example, hydroxy-, thio-, or amino-terminated functional branches can be copolymerized with comonomers, such as organic diacids (such as carboxylic acids), diisocyanates, and the like. The copolymers can also include non-functional branches in the polymer. This can provide improved impact resistance in molecules resulting from further copolymerization of the star-shaped polymers of the invention with other functional comonomers, for example, resultant polyester and/or polyamide molecules.

Novel multi-branched or star-shaped polymers having functional ends can be produced by polymerizing ethylene singly, or as a mixture or sequentially with alkenylsubstituted aromatic hydrocarbons, as described above, with protected functional organolithium initiators of Formula (II) (singly or as combinations thereof to provide arms having different protecting groups and/or different functional groups), and subsequently reacting the resulting copolymer with multifunctional linking agents. This can lead to polymer anion chain lengths of approximately the same size.

Examples of useful linking or coupling agents include halosilanes, such as silicon tetrachloride and methyl trichlorosilane; halostannanes, such as tin tetrachloride; phosphorus halides, such as phosphorus trichloride; and isomeric (mixtures of ortho, meta and para) dialkenylaryls and isomeric di- and trivinylaryls, such as 1,2-divinylbenzene, 1,3-divinylbenzene, 1,4-divinylbenzene, 1,2,4-trivinylbenzenes, 1,3-divinylnaphthalenes, 1,8-divinylnaphthalene, 1,2-diisopropenylbenzene, 1,3-diisopropenylbenzene, 1,4-diisopropenylbenzene, 1,3,5-trivinylnaphthalene, and other suitable materials known in the art to be useful for coupling polymers, as well as mixtures of coupling agents. See also U.S. Pat. Nos. 3,639,517 and 5,489,649, and R. P. Zelinski et al in J.Polym.Sci., A3, 93, (1965) for these and additional coupling agents. Mixtures of coupling agents can also be used. Generally, the amount of coupling agent used is such that the molar ratio of protected living polymer anions to coupling agents ranges from 1:1 to 24:1. This linking process is described, for example, in U.S. Pat. No. 4,409,357 and by L. J. Fetters in Macromolecules, 9,732 (1976).

These radiating multi-arm polymers with protected functionality on the ends of the arms may be optionally hydrogenated before or after removal of the protecting groups. Star polymers thus formed can have hydroxyl, thio, and/or amino functional branch ends.

Nonfunctional initiators (such as n-butyllithium, sec-butyllithium, and tert-butyllithium) may also be mixed with the functional initiators of Formula (II) to provide nonfunctional branch ends as well, which can serve to modify the physical properties of these star-shaped or radiating polymers, especially after their further copolymerization with other functional monomers, such as organic diacids or organic diisocyanates.

Alternatively, novel multi-branched or star-shaped polymers possessing functional ends (which may be the same or different) and/or both functional and non-functional ends may be produced by separately polymerizing ethylene and/or alkenylsubstituted aromatic hydrocarbons with protected functional organolithium initiators (II) and/or with non-functional organolithium initiators, subsequently mixing the resulting separately produced anions, treating the resulting mixture with multifunctional linking agents, and optionally hydrogenating before or after optionally deprotecting the functional ends of the polymer. This alternative method allows for control of the molecular weight of the arms of the star polymer (for example, different polymer anion chain lengths can be produced) and provides for a more selective control of the physical properties of the resultant polymers.

If desired, the protecting groups can be removed from the arms of the star polymer, prior to or after the optional hydrogenation of the residual unsaturation of the arms, using the techniques described above. This includes selective deprotection when dissimilarly protected functional groups are present, as detailed above.

Molecular weights of the resulting linked or coupled polymers can vary depending on the molecular weight of the polymer anion and the number of potential functional linking groups on a coupling agent. The sizes of the branches of the linked polymer can be the same or vary.

Although the polymers and processes of the invention have been described with regard to the sequential polymerization of alkenylsubstituted aromatic hydrocarbon and ethylene, the alkenylsubstituted aromatic hydrocarbons and ethylene can also be polymerized in admixture with each other to form random or tapered copolymers, or by sequential polymerization of ethylene, followed by alkenylsubstituted aromatic hydrocarbon, in the presence of the protected functional initiators of Formula (II) to form polyethylene/polyalkenylaromatic block copolymers. The present invention also provides for polymerization of ethylene singly using the protected functional initiator of Formula (II). These compounds can also be quenched or reacted further with an appropriate functionalizing compound and/or linking compound to provide functionalized, telechelic, heterotelechelic, and multi-branched or star polymers.

For example, when the protected functional initiator 3-(tert-butoxy)-1-propyllithium, chain-extended with two equivalents of isoprene, is employed (only one of the possible structures for the oligomerized isoprene is shown), the following equations show the sequence of reactions:

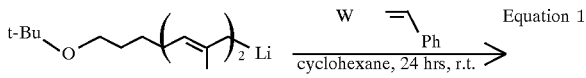

Equation 1

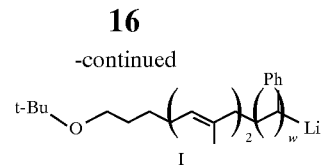
I wherein W represents the number of equivalents of styrene employed.

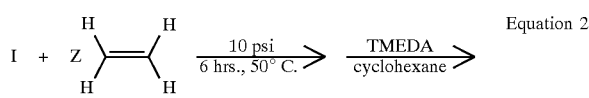

Equation 2

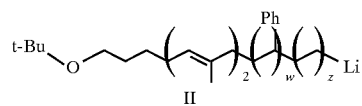
II wherein Z represents the number of equivalents of ethylene employed.

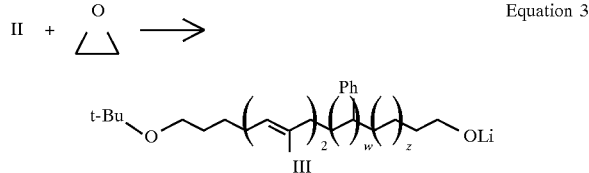

Equation 3

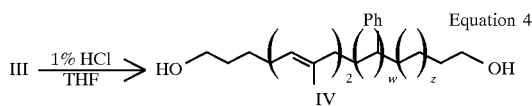

Equation 4

The values for W and Z are 88 and 21, respectively. The resulting hydroxy-terminated block copolymer IV may be designated HO—PS-b-PE—OH and has a molecular weight of about 8000.

Additionally, a wide variety of symmetrically or asymmetrically functional polymers may be produced by reacting the living polymer (II) of Equation 2 above with various functionalizing agents. For example, addition of carbon dioxide (see J.Polym.Sci., Polym.Chem. 30, 2349 (1992)) to polymer (II) would produce a polymer with one protected hydroxyl and one carboxyl group, or the living polymer (II) may be reacted with 1,5 diazabicyclo-(3.1.0) hexane as described in U.S. Pat. No. 4,753,991 to produce a polymer with one protected hydroxyl and one amino group. A polymer with one protected hydroxyl group and one protected amino group can be prepared by reaction of the living anion (II) with a protected amino propyl bromide, see Macromolecules, 23, 939 (1990). Reaction of the living polymer anion (II) with oxetane or substituted oxetanes (see U.S. Pat. No. 5,391,637) would afford a polymer which contained one protected hydroxyl and a hydroxyl group. A polymer with two protected hydroxyl groups can be prepared by reaction of the living anion (II) with a silicon derived acetal, see U.S. Pat. No. 5,478,899.

Other asymmetrically substituted polymers may be produced having epoxy or isocyanate groups at one end, for example, by reacting the lithium salt of (III) above (before hydrolysis), with epichlorohydrin or, by reacting (IV) (before deprotection) with an equivalent of a diisocyanate, such as methylene 4,4-diphenyl diisocyanate (2/1 NCO/OH). These unsymmetrically substituted polymers could then be further reacted with other comonomers either with or without simultaneous deprotection as described below.

Hydroxy-terminated protected polymers (III of Equation 3 after hydrolysis) alone and in their hydrogenated forms could be used as base materials to lend flexibility and higher impact strength in a number of formulas to produce coatings, sealants, binders and block copolymers with polyesters, polyamides and polycarbonates as described in UK Patent Application GB2270317A and in "Polytail" data sheets and brochures (Mitsubishi Kasei America).

In the presence of acidic catalysts used to promote the formation of many of these block copolymer resins, the protective group of the hydrogenated polymer is removed as well, allowing the exposed hydroxyl grouping in the base polymer molecule to simultaneously participate in the block copolymer reaction.

For example, hydroxy-terminated protected hydrogenated polymer (III) (after hydrolysis) may be reacted with bisphenol A and phosgene in the presence of appropriate catalysts with simultaneous deprotection to yield a polycarbonate alternating block copolymer. The resulting products are useful as molding resins, for example, to prepare interior components for automobiles.

A segmented polyamide-hydrogenated block copolymer is also useful as a molding composition to prepare exterior automotive components and can be prepared by reacting hydroxy-terminated protected hydrogenated polymer (III) (after hydrolysis), for example, with caprolactam and adipic acid in the presence of a suitable catalyst.

A segmented polyester-hydrogenated block copolymer is produced by reaction of hydroxy-terminated protected hydrogenated polymer (III) (after hydrolysis) with dimethyl terephthalate and a suitable acidic catalyst. Again, the products are useful as molding compounds for exterior automotive components.

Isocyanate-terminated prepolymers can be produced from hydroxy-terminated protected hydrogenated polymer (III) (after hydrolysis) by reaction with suitable diisocyanates (2/1 NCO/OH) as above and which can be further reacted with diols and additional diisocyanates to form segmented polyurethanes useful for water based, low VOC coatings. Inclusion of acid functional diols, such as dimethylolpropionic acid, in the polyurethane introduces pendant carboxyl groups which can be neutralized with tertiary amines to afford water dispersable polyolefin/polyurethane segmented polymers, useful for water based coatings. This same principle could be applied to acrylic polymers made with tertiary amine functional monomers included, which could be made by free radical polymerization following reacting the hydroxyl groups at the terminal ends of the polymer with acryloyl chloride or methacryloyl chloride to yield the corresponding acrylic functional macromonomer. Segmented polyurethane prepolymers may be mixed with tackifying resins and used as a moisture-curable sealant, caulk or coating.

Another possible application in coatings would be the use of new dendrimers, based on the use of the polymer with hydroxyl functionality at the termini thereof to form the core for dendritic hybrid macromolecules based on condensation or addition polymerizations, utilizing the hydroxyl functionality as the initiating site (see, for example Gitsov and Frechet, American Chemical Society PMSE Preprints, Volume 73, August 1995.

Yet another application includes use as toughening polymers for epoxy composites, utilizing the polymer core with the hydroxyl groups converted to half esters by reaction with anhydrides. These epoxy reactive polymers can then be utilized as reactants with epoxy resins and amines in composite systems. Reacting the hydroxyl functional polymers into unsaturated polyesters provides a new polymer toughening system for polyester molding compounds for automotive and other uses. For a review of the use of linear polymers for toughening of epoxies and polyesters, see "Rubber-Toughened Plastics", Edited By C.Keith Riew, ACS Advances in Chemistry Series , #222.

Cathodic electrodepositable coatings may be prepared from epoxy functional polymers described above by reacting with epoxy resins in the presence of excess amine or polyamine, to completely react all the epoxy groups, distilling off excess amine, and neutralizing the resulting epoxyamine adduct with water soluble organic or inorganic acids to form water soluble, quaternary ammonium containing polymer salts (see for reference, U.S. Pat. Nos. 3,617,458, 3,619,398, 3,682,814, 3,891,527, 3,947,348, and 4,093, 594). Alternatively, the above epoxy-amine polymer adducts may be converted to quaternary phosphonium or sulfonium ion containing polymers, as described in U.S. Pat. No. 3,935,087.

An acrylate-terminated prepolymer curable by free-radical processes can be prepared from hydroxy-terminated protected hydrogenated polymer (III) (after hydrolysis) by reaction with a diisocyanate (2NCO/OH) followed by further reaction with hydroxyethyl acrylate in the presence of a basic reagent.

Another likely application for acrylate or methacrylate terminated polymers include use as viscosity index (V.I.) improvers. Using carboxyl functional monomers, such as acrylic acid and methacrylic acid, and/or amine functional monomers such as acrylamide, along with free radical initiators in further polymerizations, can result in the formation of polymer segments at the periphery of each termini with amine or other functionalities which, in addition to the advantageous properties of the polymers as V.I. improvers, combines the ability to add functionality to the polymers for dispersant properties (see, for example, U.S. Pat. Nos. 5,496,898, 4,575,530, 4,486,573, 5,290,874, 5,290,868, 4,246,374 and 5,272,211).

The versatility of the hydroxyl functional polymers of this invention, and the wide range of different segmented polymers (polyethers, polyesters, polyamides, polycarbonates, polyurethanes, etc.) which can be initiated at the hydroxyl groups, leads to numerous possible applications as compatibilizers for polymer blends and alloys. In addition to the use of such blends for new applications, much recent interest is generated in the use of compatibilizers to facilitate polymer waste recycling.

The polar functional groups of the polymer chain ends allow the polymers of this invention to alter the surface properties of polymers like polyethylene (including high density polyethylene, low density polyethylene and linear low density polyethylene), polypropylene, polyisobutylene and copolymers and blends thereof. When the polymers of this invention are blended with non-polar polyolefins, the polar functional groups on the chain ends, being incompatible with the non-polar polyolefin, will phase separate and migrate to the surface of the polyolefin. The functional polymers of the invention can be added in amounts ranging from 1 to 25% by weight based on the weight of the polyolefin. Properties such as surface adhesion are thus greatly enhanced, leading to improved adhesion of pigments in printing inks for labels, composite layering, and other adhesive applications. An alternative approach to modification of polymer surfaces to alter properties by introduction of functional groups has been the use of chemical reagents such as alkyllithiums (see, for example, A. J. Dias, K-W Lee, and T. J. McCarthy, Rubber & Plastics News, 18–20, Oct.

31, 1988, and A. J. Dias and T. J. McCarthy, Macromolecules, 20, 1437 (1987).

Alternatively, protecting groups may be removed, either before or after optional hydrogenation of the aliphatic unsaturation, then the hydroxy terminated polymer may be reacted with functional comonomers to produce novel copolymers using these and other processes. Thus, for example, a hydroxy terminated polymer may be hydrogenated, and then reacted with ethylene oxide in the presence of potassium tert-butoxide to produce a poly (ethylene oxide)-hydrogenated block copolymer. This reaction sequence affords a hydrogel.

Alternatively, a hydroxy terminated protected polymer (III after hydrolysis) may be reacted with functional comonomers, without simultaneously removing the protective group. These copolymers then may be deprotected and then further reacted with the same or different comonomers to form yet other novel copolymers. Thus, for example, the hydroxyterminated polymer (III after hydrolysis) may be hydrogenated, and then reacted with ethylene oxide in the presence of potassium tert-butoxide to produce a poly (ethylene oxide) -hydrogenated polystyrene/polyethylene copolymer with one protected hydroxyl group on the polystyrene segment. This hydroxyl can then be deprotected and a poly(ethylene oxide) polymer having different chain lengths grown onto both ends of the polystyrene/ polyethylene segment.

In another possible application, the living polymer (II) may be reacted with an alkenylarylhalosilane such as styrenyldimethylchlorosilane to yield the corresponding omega-styrenyl terminated macromonomer according to the teachings of U.S. Pat. No. 5,278,244, which may then be further polymerized by a variety of techniques to yield "comb" polymers which, on deprotection and hydrogenation yield branched polymers with hydroxyfunctionality on the branch-ends. Such multi-functionality can be utilized to graft a water-soluble polymer such as polyethylene oxide onto a hydrophobic polyolefinic core to produce hydrogels.

In still another possible application, hydrogenated hydroxyterminated branches of the polymers may be further reacted with acryloyl chloride or methacryloyl chloride, and the resultant acrylate or methacrylate-terminated polymer further polymerized with monomers selected from the group of alkyl acrylates, alkyl methacrylates, and dialkylacrylamides to produce hydrogels. Further, acrylate or methacrylate-terminated polymers may be polymerized by free-radical processes.

The following examples further illustrate the invention.

PREPARATION OF THE INITIATORS

Example A

Preparation of 3-(t-Butyldimethylsilyloxy)-1-Propyllithium Chain Extended with 2 Moles of Isoprene A 500 ml, three-necked Morton flask was equipped with a mechanical stirrer, a 125 ml pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.20 grams (0.749 mole, 2.80 equivalents) was transferred to the flask with 260 ml cyclohexane. This suspension was stirred at 450 RPMs, and heated to 65° C. with a heating mantle. The heat source was removed. 1-(t-Butyldimethylsilyloxy)-3-chloro-propane, 58.82 grams (0.268 mole, 1.00 equivalent) was added dropwise. An exotherm was detected after 31.8% of the feed had been added. A dry ice/hexane cooling bath was applied to maintain the reaction temperature at 60°–650° C. The total feed time was one hundred five minutes. An exotherm was noted until the last drop of feed was added, then the temperature fell off rapidly to room temperature. The reaction mixture was stirred at room temperature for forty five minutes, then heated to 65° C. with a heating mantle. The heat source was removed. Isoprene, 36.45 grams (0.535 mole, 2.00 equivalents) was then added dropwise. An exotherm was noted after 24.6% of the feed had been added. Hexane cooling was applied to maintain the reaction temperature at 60°–65° C. The total isoprene feed time was thirty eight minutes. The reaction mixture was allowed to stir at room temperature for one hour, then transferred to a small pressure filter with argon pressure. Very rapid filtration was observed with 2 psi argon. The muds were reslurried with cyclohexane (2×50 ml). This afforded an orange solution, yield=530 ml, 425.34 grams. Total base=17.1 wt. %; Active C—Li=15.9 wt %; Yield (based on active C—Li)=80.8%.

Example B

Preparation of 3-(t-Butyldimethylsilylthio)-1-propyllithium Chain Extended with 2 Moles of Isoprene A 500 ml, three-necked Morton flask is equipped with a mechanical stirrer, a 125 ml pressure-equalizing addition funnel, and a Claisen adapter fitted with a thermocouple, a reflux condenser, and an argon inlet. This apparatus is dried in an oven overnight at 125° C., assembled hot, and allowed to cool to room temperature in a stream of argon. Lithium dispersion is washed free of mineral oil with hexane (2×70 ml), and pentane (1×70 ml), then dried in a stream of argon. The dry dispersion, 5.20 grams (0.749 mole, 2.80 equivalents) is transferred to the flask with 260 ml cyclohexane. This suspension is stirred at 450 RPMs, and heated to 65° C. with a heating mantle. The heat source is removed. 1-(t-Butyldimethylsilylthio)-3-chloro-propane, 60.22 grams (0.268 mole, 1.00 equivalent) is added dropwise. An exotherm is detected after 21.8% of the feed has been added. A dry ice/hexane cooling bath is applied to maintain the reaction temperature at 60°–65° C. The total feed time is one hundred minutes. An exotherm is noted until the last drop of feed is added, then the temperature falls off rapidly to room temperature. The reaction mixture is stirred at room temperature for forty five minutes, then heated to 65° C. with a heating mantle. The heat source is removed. Isoprene, 36.45 grams (0.535 mole, 2.00 equivalents) is then added dropwise. An exotherm is noted after 24.6% of the feed has been added. Hexane cooling is applied to maintain the reaction temperature at 60°–65° C. The total isoprene feed time is thirty eight minutes. The reaction mixture is allowed to stir at room temperature for one hour, then transferred to a small pressure filter with argon pressure. Very rapid filtration is achieved with 2 psi argon. The muds are reslurried with cyclohexane (2×50 ml). This affords an orange solution; yield=530 ml, 435.21 grams. Total base=17.7 wt. %; Active C—Li=16.9 wt %; Yield (based on active C—Li)=82.4%.

Example C

Preparation of 3-(N,N-Dimethylamino)-1-propyllithium Chain Extended with 2 Moles of Isoprene A 500 ml, three-necked Morton flask was equipped with a mechanical stirrer, a 125 ml pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon.

Lithium dispersion was washed free of mineral oil with hexane (2×70 ml), and pentane (1×70 ml), then dried in a stream of argon. The dry dispersion, 10.57 grams (1.520 moles) was transferred to the flask with 250 ml cyclohexane. Coarse sand, 45.3 grams, was added to the reaction mixture. This suspension was stirred at 600–675 RPMs, and heated to 37° C. with a heating mantle. The heat source was removed. 1-Chloro-3-(N,N-dimethylamino)propane, 19.64 grams (0.1615 mole) dissolved in 120 ml. Cyclohexane was added dropwise. An exotherm (up to 52° C.) was detected after 7% of the feed had been added. A dry ice/hexane cooling bath was applied to maintain the reaction temperature at 41°–44° C. The total feed time was thirty-two minutes. An exotherm was noted until the last drop of feed was added, then the temperature was maintained at 36°–40° C. for an additional thirty minutes. The reaction mixture was then transferred to a sintered glass filter while still warm. The filtration was complete in three minutes with three psi argon pressure. This afforded a hazy suspension. Yield=400 ml, 298.2 grams. Active C—Li=0.361M (0.469 m/kg) at 40° C. Yield (based on active C—Li=87%.

The product crystallized from solution upon standing at room temperature. The concentration of the clear supernatant solution was about 0.3M.

A dry 500 ml round bottom flask was fitted with a magnetic stir bar, and an argon inlet. This apparatus was purged with argon, then 154.77 grams (0.0726 mole) of the suspension prepared above was added to the flask. Isoprene, 9.4 grams (0.138 mole, 1.90 equivalents) was then added all at once. The reaction mixture was then heated to 48°–49° C. for forty minutes. This afforded a slightly hazy golden solution, which was partially vacuum-stripped on the rotary evaporator to afford the product solution. Yield=43.32 grams. Active C—Li=1.36M (1.65 m/kg). Recovered yield (based on active C—Li)=98.5%.

EXAMPLES OF THE INVENTION—PREPARATION OF POLYMERS

EXAMPLE 1
Initiating Hydroxyl Chain-End Functionalization of Poly(styrene-b-ethylene)

Polymers with the hydroxyl functional group at the initiating chain end were obtained by using 3-(tert-butyldimethylsilyloxy)-1-propyllithium as initiator. Styrene (10 mL, 9.08 g) was polymerized by using the 3-(tert-butyldimethylsilyloxy)-1-propyllithium (1.7 mL, 0.73M in cyclohexane) as initiator in 100 mL of cyclohexane at room temperature overnight. An aliquot of the poly(styryl)lithium solution (40 mL) was removed from the reactor and quenched with degassed methanol to obtain the polystyrene base polymer. The reactor containing the remaining poly(styryl)lithium solution was degassed by vacuum.

TMEDA ([TMEDA]/[Li]=1.5) was added into the poly(styryl)lithium solution and ethylene monomer was purged into the reactor via a breakseal. The polymerization proceeded at 50° C. for 6 hours with stirring under 10 psi of ethylene pressure. Unreacted ethylene was removed by evacuation. The living copolymer was terminated with degassed methanol. The copolymer was isolated by precipitation into excess methanol and dried in a vacuum oven. The hydroxyl-functionalized polymers were obtained by deprotecting the tert-butyldimethylsilyl-group using 1 vol. % HCl in tetrahydrofuran under reflux for 5 hours. $M_n$=7,200 g/mol, PDI=1.42; Yield of Functionality: $M_n$(VPO)/$M_n$(titration)= 1.03.

EXAMPLE 2
Initiating Amine Chain-End Functionalization of Poly(styrene-b-ethylene)

Poly(styrene-b-ethylene) with an amine functional group at the initiating chain end was prepared by polymerization of the block copolymer using the functionalized initiator, 3-dimethylaminopropyl-lithium. Styrene (10 mL, 9.08 g) was polymerized by using 3-dimethyl-aminopropyl-lithium (1.7 mL, 0.8M in cyclohexane) as initiator in 100 mL of cyclohexane at room temperature overnight.

After degassing the reactor, TMEDA ([TMEDA]/[Li]= 1.5) was added into poly(styryl)lithium solution and ethylene monomer was purged into the reactor via a breakseal. The polymerization proceeded at 50° C. for 5 hours with stirring under 10 psi of ethylene pressure. Unreacted ethylene was removed by evacuation. The living copolymer was terminated with degassed methanol. The copolymer was isolated by precipitation into excess methanol and dried in a vacuum oven. $M_n$=7,500 g/mol, PDI=1.38; Yield of Functionality: $M_n$(VPO)/$M_n$(titration)=0.96.

EXAMPLE 3
Syrnthesis of Telechelic Polymer HO-PS-b-PE—OH Using Chain Extended Initiator Telechelic polymers with a hydroxy functional group at both chain-ends are obtained by using 3-t-butoxy-1-propyllithium chain-extended with two equivalents of isoprene as the initiator. Styrene (87.2 mmol) is polymerized with this initiator (1.2 mmol in 0.7M in cyclohexane) in 100 mL of cyclohexane at room temperature overnight.

After degassing the reaction mixture by vacuum, TMEDA ([TMEDA]/[Li]=1.5) is added followed by the ethylene monomer via a breakseal. The polymerization proceeds at 50° C. for 6 hours with stirring under 10 psi of ethylene pressure. Unreacted ethylene is removed by evacuation, followed by the addition of ethylene oxide (~0.14M cyclohexane solution, 4.8 mmol, 4.0 molar excess) through a breakseal at room temperature. The reaction mixture is kept overnight at room temperature. Deprotection is effected by heating under reflux for several hours with para-toluenesulfonic acid. The polymer is precipitated into excess methanol and dried in a vacuum oven.

EXAMPLE 4
Synthesis of Telechelic Star Polymers

Telechelic star polymers with a hydroxy functional group at the chain-ends are obtained using 3-(tert-butyldimethylsilyloxy)-1-propyllithium as the initiator and tetrachlorosilane as the coupling agent. Styrene (87.2 mmol) is polymerized with the 3-(tert-butyldimethylsilyloxy)-1-propyllithium (1.2 mmol, 0.7M in cyclohexane) in 100 mL of cyclohexane at room temperature overnight.

After degassing the reaction mixture by vacuum, TMEDA ([TMEDA]/[Li]=1.5) is added followed by the ethylene monomer via a breakseal. The polymerization proceeds at 50° C. for 6 hours with stirring under 10 psi of ethylene pressure. Unreacted ethylene is removed by evacuation, followed by the addition of tetrachlorosilane (0.3 mmol) through a breakseal at room temperature. The reaction mixture is kept overnight at room temperature. The hydroxyl-functionalized star polymer is obtained by deprotecting the tert-butyldimethylsilyl group with 1 vol. % HCl in tetrahydrofuran under reflux for 5 hours. The polymer is precipitated into excess methanol and dried in a vacuum oven.

COMPARATIVE EXAMPLES

EXAMPLE 5
Synthesis of Poly(styrene-b-ethylene)

Styrene (9.20 mL, 8.36 g) was polymerized in 100 mL of cyclohexane, using sec-butyllithium (4 mL of 1.4M in cyclohexane, 5.6 mmol) as initiator. An aliquot of the poly(styryl)lithium solution (70 mL) was taken, followed by attachment of the ampoule onto the another reactor equipped with ampoules of TMEDA and degassed methanol. The rest of poly(styryl)lithium solution was quenched with degassed methanol to obtain the polystyrene base polymer. After complete evacuation of the reactor in the high vacuum line, poly(styryl)lithium (100 mL, 0.04M cyclohexane solution, 4 mmol) and TMEDA (10 mL, 0.052M cyclohexane solution, 5.2 mmol, 1.5 molar equivalents relative to the chain end concentration) were delivered into the reactor through breakseals. The ethylene monomer was purged into the reactor via a breakseal. The polymerization proceeds at 50° C. for 2–7 hours with stirring under 10 psi of ethylene pressure. Unreacted ethylene is removed by evacuation. The living copolymer was terminated with degassed methanol. The copolymer was isolated by precipitation into excess methanol and dried in a vacuum oven.

Another synthesis of poly(styrene-b-ethylene) was carried out at 32 psi of ethylene pressure. The poly(styryl)lithium (70 mL, 0.04M cyclohexane solution, 4 mmol) and TMEDA (10 mL, 0.052M cyclohexane solution, 5.2 mmol, 1.5 molar equivalents relative to the chain end concentration) were transferred in the dry box to a 500 mL pressure bottle (Fisher) equipped with metal inlet and outlet gas tubes. The pressure bottle was taken from the dry box, followed by attachment to a vacuum line which was connected to the ethylene monomer tank. After degassing of the pressure bottle in the vacuum line, ethylene monomer was purged into the pressure bottle via the metal tube. The polymerization was carried out at 32 psi of ethylene pressure in cyclohexane for 1.5–2 hours with stirring. After the polymerization, the pressure bottle was degassed, followed by distillation of degassed methanol to the pressure bottle to terminate the living block copolymer. The rest of the procedures were the same as those described above.

EXAMPLE 6
Synthesis of Poly(ethylene-b-styrene)

Ethylene was polymerized using sec-butyllithium (4 mL of 1.4M in cyclohexane, 5.6 mmol) as initiator in cyclohexane at 50° C. and 10 psi for 2 hours in the presence of TMEDA (10 mL, 0.084M cyclohexane solution, 8.4 mmol, 1.5 molar equivalents relative to the chain end concentration. Styrene (10 mL, 9.08 g) was added to the reactor through a breakseal. The reaction was kept at room temperature overnight. The reaction was terminated by addition of a few mL of degassed methanol. The polymer was precipitated into excess methanol, followed by drying in a vacuum oven.

EXAMPLE 7
Terminal Chain-End Functionalization of Poly(styrene-b-ethylene)

Ampoules of poly(styrene-b-ethenyl)lithium in cyclohexane solution, ethylene oxide in cyclohexane solution, and degassed methanol were attached to a reactor to prepare hydroxyl-functionalized block copolymer. After evacuation of the reactor, ethylene oxide (10 mL, 0.14M cyclohexane solution, 14.0 mmol, 4.0 molar excess) was added to poly (styrene-b-ethenyl)lithium (100 mL, 0.035M, in cyclohexane solution, 3.5 mmol, $M_n$=1,900 g/mole, PDI=1.10) through a breakseal at room temperature. The reaction mixture was kept at room temperature overnight. After termination by a few mL of HCl (0.1 vol. % of concentrated HCl in methanol), the polymer was precipitated into excess methanol. The polymer was dried in a vacuum oven. Yield of functionalization=50%.

Amination of poly(styrene-b-ethenyl)lithium was effected by adding 1-(4-dimethylaminophenyl)-1-phenylethylene (10 mL, 0.14M cyclohexane solution, 14.0 mmol, 1.2 molar excess) to poly(styrene-b-ethenyl)lithium (100 mL, 0.035M, in cyclohexane solution, 3.5 mmol $M_n$=1,900 g/mole, PDI= 1.10) in cyclohexane at room temperature. The crossover reaction was monitored by UV-visible spectroscopy by observing a peak maximum at 410 nm after addition of 1-(4-dimethylaminophenyl)-1-phenylethylene. The reaction mixture was kept at room temperature for 3 days. After termination by addition of a few mL of degassed methanol, the polymer was isolated by precipitation into excess methanol. Yield of functionalization=55%.

Carboxylation of the block copolymer was similar to the above hydroxylation except that carbon dioxide was used as the functionalizing reagent. Thus, carbon dioxide (flow rate: 4 LPM) was added to the poly(styrene-b-ethenyl)lithium (100 mL, 0.035M, in cyclohexane solution, 3.5 mmol, $M_n$=1,900 g/mole, PDI=1.10) at room temperature for 2 hours without stirring. After termination by addition of a few mL of HCl (0.1 vol. % of concentrated HCl in methanol), the polymer was precipitated into excess methanol. The polymer was dried in a vacuum oven. Yield of functionalization= 47%.

The foregoing examples are illustrative of the present invention and are not to be construed as limiting thereof. The invention is defined by the following claims, with equivalents of the claims to be included therein.

That which is claimed is:

1. A copolymer having the formula:

$$FG-(A)_y(B)_z-(Q)_n-Z-J-[Y(R^1R^2R^3)]_x \qquad (I)$$

wherein:

FG is H or a protected or non-protected functional group;

each A and B is a hydrocarbyl group, one of which is derived by incorporation of one or more alkenylsubstituted aromatic compounds, and the other of which is derived by incorporation of ethylene;

y and z represent the equivalents of A and B employed, respectively, and are integers from 10 to 200;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 0 to 5;

Z is a branched or straight chain hydrocarbon group which contains 3–25 carbon atoms, optionally containing aryl or substituted aryl groups;

J is oxygen, sulfur, or nitrogen;

$[Y(R^1R^2R^3)]_x$ is a protecting group, in which Y is an element selected from Group IVa of the Periodic Table of Elements;

$R^1$, $R^2$, and $R^3$ are each independently selected from the group consisting of hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen.

2. The copolymer of claim 1, wherein each of A, B and Q comprises one or more alkenylsubstituted aromatic compounds independently selected from the group consisting of styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene, alkyl, cycloalkyl, aryl, alkylaryl and arylalkyl derivatives thereof in which the total number of carbon atoms in the combined hydrocarbon constituents is not greater than 18, and mixtures thereof.

3. The copolymer of claim 1, wherein each of A, B and Q comprises styrene.

4. The copolymer of claim 1, wherein A is ethylene and B is styrene.

5. The copolymer of claim 1, wherein FG is selected from the group consisting of H, hydroxyl, thio, amino, carboxyl, amide, silyl, acrylate, sulfonic acid, isocyanate, and epoxide.

6. The copolymer of claim 1, wherein Y is carbon or silicon.

7. The copolymer of claim 1, wherein at least a portion of aliphatic unsaturation of said copolymer is saturated with hydrogen.

8. The copolymer of claim 7, wherein at least about 90% of aliphatic unsaturation is saturated with hydrogen.

9. The copolymer of claim 7, wherein at least a portion of aliphatic unsaturation of said copolymer is saturated with hydrogen prior to deprotecting said copolymer.

10. The copolymer of claim 7, wherein at least a portion of aliphatic unsaturation of said copolymer is saturated with hydrogen after deprotecting said copolymer.

11. A polymer produced by polymerizing ethylene singly to form a homopolymer, or in admixture with or sequentially with one or more alkenylsubstituted aromatic compound comonomers to form a random or block copolymer, respectively, with a protected functional organometallic initiator of the formula

$$M-Q_n-Z-J-[Y(R^1R^2R^3)]_x \quad (II)$$

wherein:

M is an alkali metal;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 0 to 5;

Z is a branched or straight chain hydrocarbon group which contains 3–25 carbon atoms, optionally containing aryl or substituted aryl groups;

Y is an element selected from Group IVa of the Periodic Table of Elements;

J is oxygen, sulfur, or nitrogen;

$R^1$, $R^2$, and $R^3$ are each independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen, to form a mono-protected, mono-functionalized living polymer, followed by quenching or functionalizing the living polymer with a functionalizing group to terminate and end-cap said living polymer.

12. The polymer of claim 11, wherein said polymer is produced by polymerizing ethylene sequentially with one or more alkenylsubstituted aromatic compounds to form a block copolymer.

13. The polymer of claim 11, wherein each of said comonomer and Q comprises one or more alkenylsubstituted aromatic compounds independently selected from the group consisting of styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene, alkyl, cycloalkyl, aryl, alkylaryl and arylalkyl derivatives thereof in which the total number of carbon atoms in the combined hydrocarbon constituents is not greater than 18, and mixtures thereof.

14. The polymer of claim 11, wherein each of said comonomer and Q comprises styrene.

15. The polymer of claim 11, wherein Y is carbon or silicon.

16. The polymer of claim 11, wherein at least a portion of aliphatic unsaturation of said polymer is saturated with hydrogen.

17. The polymer of claim 16, wherein at least about 90% of aliphatic unsaturation has been saturated with hydrogen.

18. The polymer of claim 16, wherein at least a portion of aliphatic unsaturation of said polymer is saturated with hydrogen prior to deprotecting said polymer.

19. The polymer of claim 16, wherein at least a portion of aliphatic unsaturation of said polymer is saturated with hydrogen after deprotecting said polymer.

20. The polymer of claim 11, wherein $[Y(R^1R^2R^3)]_x$ has been removed and wherein J is terminated with hydrogen.

21. The polymer of claim 11, wherein said functionalizing compound is selected from the group consisting of ethylene oxide, propylene oxide, styrene oxide, oxetane, oxygen, sulfur, carbon dioxide, chlorine, bromine, iodine, chlorotrimethylsilane, styrenyldimethyl chlorosilane, 1,3-propane sultone, caprolactam, N-benzylidene trimethylsilylamide, dimethyl formamide, silicon acetals, 1,5-diazabicyclo[3.1.0]hexane, allyl bromide, allyl chloride, methacryloyl chloride, 3-(dimethylamino)-propyl chloride, N-(benzylidene)trimethylsilylamine, epichlorohydrin, epibromohydrin, and epiiodohydrin.

22. The polymer of claim 11, wherein said organometallic initiator is selected from the group consisting of omega-(tert-alkoxy)-1-alkyllithiums, omega-(tert-alkoxy)-1-alkyllithiums chain extended with a compound selected from the group consisting of conjugated alkadienes, alkenyl-substituted aromatic compounds, and mixtures thereof, omega-(tert-alkylthio)-1-alkyllithiums, omega-(tert-alkylthio)-1-alkyllithiums chain extended with a compound selected from the group consisting of conjugated alkadienes, alkenylsubstituted aromatic compounds, and mixtures thereof, omega-(tert-butyldimethylsilyloxy)-1-alkyllithiums, omega-(tert-butyldimethylsilylthio)-1-alkyllithiums, omega-(dialkylamino)-1-alkyllithiums, omega-(dialkylamino)-1-alkyllithiums chain-extended with a compound selected from the group consisting of conjugated alkadienes, alkenylsubstituted aromatic compounds, and mixtures thereof, and omega-(bis-tert-alkylsilylamino)-1-alkyllithiums.

23. The polymer of claim 22, wherein said organometallic initiator is selected from the group consisting of 3-(1,1-dimethylethoxy)-1-propyllithium, 3-(tert-butyldimethylsilyloxy)-1-propyllithium, 3-(1,1-dimethylethylthio)-1-propyllithium, 3-(dimethylamino)-1-propyllithium, 3-(di-tert-butyldimethylsilylamino)-1-propyllithium, 3-(1,1-dimethylethoxy)-1-propyllithium, 3-(1,1-dimethylethoxy)-2-methyl-1-propyllithium, 3-(1,1- dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium, 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 4-(ethoxy)-1-butyllithium, 4-(propyloxy)-1-butyllithium, 4-(1-methylethoxy)-1-butyllithium, 3-(triphenylmethoxy)-2,2-dimethyl-1-propyllithium, 4-(triphenylmethoxy)-1-butyllithium, 3-[3-(dimethylamino)-1-propyloxy]-1-propyllithium, 3-[2-(dimethylamino)-1-ethoxy]-1-propyllithium, 3-[2-(diethylamino)-1-ethoxy]-1-propyllithium, 3-[2-(diisopropyl)amino]-1-ethoxy]-1-propyllithium, 3-[2-(1-piperidino)-1-ethoxy]-1-propyllithium, 3-[2-(1-pyrrolidino)-1-ethoxy]-1-propyllithium, 4-[3-(dimethylamino)-1-propyloxy]-1-butyllithium, 6-[2-(1-piperidino)-1-ethoxy]-1-hexyllithium, 3-[2-(methoxy)-1-ethoxy]-1-propyllithium, 3-[2-(ethoxy)-1-ethoxy]-1-propyllithium, 4-[2-(methoxy)-1-ethoxy]-1-butyllithium, 5-[2-(ethoxy)-1-ethoxy]-1-pentyllithium, 3-[3-(methylthio)-1-propyloxy]-1-propyllithium, 3-[4-(methylthio)-1-butyloxy]-1-propyllithium, 3-(methylthiomethoxy)-1-propyllithium, 6-[3-(methylthio)-1-propyloxy]-1-hexyllithium, 3-[4-(methoxy)-benzyloxy]-1-propyllithium, 3-[4-(1,1-dimethylethoxy)-benzyloxy]-1-propyllithium, 3-[2,4-(dimethoxy)-benzyloxy]-1-propyllithium, 8-[4-(methoxy)-benzyloxy]-1-octyllithium, 4-[4-(methylthio)-benzyloxy]-1-butyllithium, 3-[4-(dimethylamino)-benzyloxy]-1-propyllithium, 6-[4-(dimethylamino)-benzyloxy]-1-hexyllithium, 5-(triphenylmethoxy)-1-pentyllithium, 6-(triphenylmethoxy)-1-hexyllithium, and 8-(triphenylmethoxy)-1-octyllithium, 3-(hexamethyleneimino)-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium, 6-(t-butyldimethylsilylthio)-1-hexyllithium, 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium, chain extended oligomeric analogs thereof comprising a hydrocarbyl group derived by incorporation of a compound selected from the group consisting of conjugated alkadienes, alkenyl substituted aromatic compounds, and mixtures thereof, and mixtures thereof.

24. The polymer of claim 11, wherein at least one or both of said functional groups is deprotected, and wherein said polymer further includes a comonomer reacted with at least one of said deprotected functional groups, with the proviso that when J is reacted with said comonomer, J is O or S.

25. The polymer of claim 24, wherein said comonomer is selected from the group consisting of lactams, cyclic ethers, diamines, diisocyanates, polyisocyanates, diamides, polyamides, cyclic amides, dicarboxylic acids, polycarboxylic acids, diols, polyols, anhydrides and mixtures thereof.

26. The polymer of claim 25, wherein said polymer includes at least one hydroxyl functional group, and wherein said at least one hydroxyl functional group is reacted with diisocyanate and diol to produce polyurethane blocks.

27. The polymer of claim 26, wherein said diol includes acid group functionalities, and wherein said acid group functionalities are neutralized with tertiary amines to provide dispersibility in water.

28. The polymer of claim 25, wherein said polymer includes at least one hydroxyl functional group, and wherein said at least one hydroxyl functional group is reacted with diacid or anhydride and diamine or lactam to produce polyamide blocks.

29. The polymer of claim 25, wherein said polymer includes at least one hydroxyl functional group, and wherein said at least one hydroxyl functional group is reacted with diacid or anhydride and diol or polyol to produce polyester blocks.

30. The polymer of claim 29, wherein at least a portion of said diacid or anhydride is substituted by an unsaturated acid or anhydride to provide unsaturated polyester blocks capable of crosslinking with unsaturated monomers by addition of free radical initiators.

31. The polymer of claim 25, wherein said polymer includes at least one hydroxyl functional group, and wherein said at least one hydroxyl functional group is reacted with anhydride to form a half-ester with free carboxyl functionality at the terminus thereof.

32. The polymer of claim 31, wherein said carboxyl functional terminal groups are further reacted with epoxy resins and amine curing agents to form epoxy resin composites.

33. The polymer of claim 25, wherein said polymer includes at least one hydroxyl functional group, and wherein said at least one hydroxyl functional group is reacted with methacryloyl chloride or acryloyl chloride to provide polymerizable alkenyl groups at the terminus thereof.

34. The polymer of claim 33, further comprising acrylic monomers polymerized by use of free radical initiators onto said alkenyl terminal groups.

35. The polymer of claim 34, wherein said acrylic acid monomers are functional or amide functional acrylic monomers, to provide polar hydrophilic polymer segments.

36. The polymer of claim 33, wherein sulfonated styrene and/or 4-vinyl pyridine are polymerized by free radical initiators onto said terminal alkenyl groups to provide functional polymer segments capable of improving dispersability of the polymer.

37. The polymer of claim 25, wherein said polymer includes at least one hydroxyl functional group, and wherein said at least one hydroxyl functional group is reacted with sulfonyl chloride in the presence of a tertiary amine catalyst to form sulfonate functional groups at the terminus thereof.

38. The polymer of claim 37, wherein said sulfonate functional groups are reacted with primary amines or ammonia, under heat and pressure, to form polymers with amine functionality at the terminus thereof.

39. The polymer of claim 31, wherein said carboxyl functional groups are reacted with an epoxy resin and an excess of amine to completely react all of the epoxy groups, the excess amine is removed by distillation, and the resulting epoxy-amine adduct is reacted with a water soluble organic or inorganic acid to form water soluble quaternary ammonium containing polymers.

40. A multi-branched or star-shaped polymer having at least one functional end produced by polymerizing ethylene singly, or sequentially or as mixture thereof with one or more alkenylsubstituted aromatic compound comonomers, with a protected functional organometallic initiator, having the formula:

$$M-Q_n-Z-J-[Y(R^1R^2R^3)]_x \qquad (II)$$

wherein:

M is an alkali metal;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 0 to 5;

Z is a branched or straight chain hydrocarbon group which contains 3–25 carbon atoms, optionally containing aryl or substituted aryl groups;

Y is an element selected from Group IVa of the Periodic Table of Elements;

J is oxygen, sulfur, or nitrogen;

$R^1$, $R^2$, and $R^3$ are each independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen, to form a mono-protected, mono-functionalized living polymer; and coupling said living polymer with at least one other living polymer with a linking agent.

41. The polymer of claim 40, wherein said linking agent is selected from the group consisting of halosilanes, halostannanes, phosphorus halides, isomeric dialkenylaryls, isomeric divinylaryls, isomeric trivinylaryls, and mixtures thereof.

42. The polymer of claim 40, wherein ethylene is sequentially polymerized with said alkenylsubstituted aromatic compound.

43. The polymer of claim 40, wherein each of said comonomer and Q comprises styrene.

44. The polymer of claim 40, wherein Y is carbon or silicon.

45. The polymer of claim 40, wherein at least a portion of aliphatic unsaturation of said polymer has been saturated with hydrogen.

46. The polymer of claim 45, wherein at least about 90% of aliphatic unsaturation has been saturated with hydrogen.

47. The polymer of claim 45, wherein at least a portion of aliphatic unsaturation of said polymer has been saturated with hydrogen prior to deprotecting said polymer.

48. The polymer of claim 45, wherein at least a portion of aliphatic unsaturation of said polymer has been saturated with hydrogen after deprotecting said polymer.

49. The polymer of claim 40, wherein $[Y(R^1R^2R^3)]_x$ has been removed and wherein J is terminated with hydrogen.

50. The polymer of claim 40, wherein said polymer is copolymerized with at least one comonomer, with the proviso that when J is reacted with said comonomer, J is O or S.

51. The polymer of claim 50, wherein said comonomer is selected from the group consisting of lactams, cyclic ethers, diamines, diisocyanates, polyisocyanates, diamides, polyamides, cyclic amides, dicarboxylic acids, polycarboxylic acids, diols, polyols, anhydrides and mixtures thereof.

52. The polymer of claim 51, wherein said polymer includes at least one hydroxyl functional group, and wherein said at least one hydroxyl functional group is reacted with diisocyanate and diol to produce polyurethane blocks.

53. The polymer of claim 52, wherein said diol includes acid group functionalities, and wherein said acid group functionalities are further neutralized with tertiary amines to provide dispersibility in water.

54. The polymer of claim 48, wherein said polymer includes at least one hydroxyl functional group, and wherein said at least one hydroxyl functional group is reacted with diacid or anhydride and diamine or with lactam to produce polyamide blocks.

55. The polymer of claim 48, wherein said polymer includes at least one hydroxyl functional group, and wherein said at least one hydroxyl functional group is reacted with diacid or anhydride and diol or polyol to produce polyester blocks.

56. The polymer of claim 55, wherein at least a portion of said diacid or anhydride is substituted by an unsaturated acid or anhydride to provide unsaturated polyester blocks capable of crosslinking with unsaturated monomers by addition of free radical initiators.

57. The polymer of claim 51, wherein said polymer includes at least one hydroxyl functional group, and wherein said at least one hydroxyl functional group is reacted with anhydride to form a half-ester with free carboxyl functionality at the terminus thereof.

58. The polymer of claim 57, wherein said carboxyl functional terminal groups are further reacted with epoxy resins and amine curing agents to form epoxy resin composites.

59. The polymer of claim 51, wherein said polymer includes at least one hydroxyl functional group, and wherein said at least one hydroxyl functional group is reacted with methacryloyl chloride or acryloyl chloride to provide polymerizable alkenyl groups at the terminus thereof.

60. The polymer of claim 59, further comprising acrylic monomers polymerized by use of free radical initiators onto said alkenyl terminal groups.

61. The polymer of claim 60, wherein said acrylic acid monomers are functional or amide functional acrylic monomers, to provide polar hydrophilic polymer segments.

62. The polymer of claim 59, wherein sulfonated styrene and/or 4-vinyl pyridine are polymerized by free radical initiators onto said terminal alkenyl groups to provide functional polymer segments capable of improving dispersability of the polymer.

63. The polymer of claim 51, wherein said polymer includes at least one hydroxyl functional group, and wherein said at least one hydroxyl functional group is reacted with sulfonyl chloride in the presence of a tertiary amine catalyst to form sulfonate functional groups at the terminus thereof.

64. The polymer of claim 63, wherein said sulfonate functional groups are reacted with primary amines or ammonia, under heat and pressure, to form polymers with amine functionality at the terminus thereof.

65. The polymer of claim 57, wherein said carboxyl functional groups are reacted with an epoxy resin and an excess of amine to completely react all of the epoxy groups, the excess amine is removed by distillation, and the resulting epoxy-amine adduct is reacted with a water soluble organic or inorganic acid to form water soluble quaternary ammonium containing polymers.

66. The polymer of claim 40, wherein said polymer includes at least one functional end and at least one non-functional end prepared by polymerizing ethylene singly, or sequentially or as mixture thereof with a alkenylsubstituted aromatic hydrocarbon, with said protected functional organometallic initiator of Formula (II), and in addition with a non-functional organometallic initiator.

67. The polymer of claim 40, wherein said polymer includes at least two functional ends having different functional groups prepared by polymerizing ethylene singly, or sequentially or as mixture thereof with one or more alkenyl-substituted aromatic compounds, with protected functional organometallic initiators of Formula (II) in which J is different.

68. The polymer of claim 40, wherein said polymer includes at least two functional ends having different protecting groups prepared by polymerizing ethylene singly, or sequentially or as mixture thereof with one or more alkenyl-substituted aromatic compounds, with protected functional organometallic initiators of Formula (II) in which $[Y(R^1R^2R^3)]_x$ is different.

69. A process for preparing polymers including ethylene as a component thereof, comprising:
polymerizing ethylene singly, as an admixture with an alkenylsubstituted aromatic hydrocarbon, or sequentially with one or more alkenylsubstituted aromatic compound comonomers, with a protected functional organometallic initiator of the formula

$$M-Q_n-Z-J-[Y(R^1R^2R^3)]_x \quad (II)$$

wherein:
M is an alkali metal;
Q is a saturated or unsaturated hydrocarbyl group derived by incorporation of a compound selected from the group consisting of conjugated diene hydrocarbons, alkenylsubstituted aromatic compounds, and mixtures thereof;
n is an integer from 0 to 5;
Z is a branched or straight chain hydrocarbon group which contains 3–25 carbon atoms, optionally containing aryl or substituted aryl groups;
J is oxygen, sulfur, or nitrogen;
Y is an element selected from Group IVa of the Periodic Table of Elements;
$R^1$, $R^2$, and $R^3$ are each independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and
x is dependent on the valence of J and varies from one when J is oxygen or sulfur to two when J is nitrogen, to form a mono-protected, mono-functionalized living polymer.

70. The process of claim 69, further comprising quenching said living polymer after said polymerizing step.

71. The process of claim 69, further comprising functionalizing said living polymer with a functionalizing compound capable of terminating or end-capping a living polymer after said polymerizing step.

72. The process of claim 69, wherein ethylene is sequentially polymerized with one or more alkenylsubstituted aromatic compounds to form a block copolymer.

73. The process of claim 69, wherein each of said comonomer and Q comprises one or more alkenylsubstituted aromatic compounds independently selected from the group consisting of styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene, alkyl, cycloalkyl, aryl, alkylaryl and arylalkyl derivatives thereof in which the total number of carbon atoms in the combined hydrocarbon constituents is not greater than 18, and mixtures thereof.

74. The process of claim 70, wherein each of said comonomer and Q comprises styrene.

75. The process of claim 69, wherein Y is carbon or silicon.

76. The process of claim 69, further comprising saturating at least a portion of aliphatic unsaturation of said polymer with hydrogen.

77. The process of claim 76, wherein said saturating step comprises saturating at least about 90% of aliphatic unsaturation with hydrogen.

78. The process of claim 76, wherein said saturating step comprising saturating at least a portion of aliphatic unsaturation of said polymer with hydrogen prior to deprotecting said polymer.

79. The process of claim 76, further deprotecting said polymer prior to said saturating step.

80. The process of claim 69, further comprising deprotecting said polymer after said polymerizing step.

81. The process of claim 71, wherein said functionalizing step comprises functionalizing said living polymer with a functionalizing compound selected from the group consisting of ethylene oxide, propylene oxide, styrene oxide, oxetane, oxygen, sulfur, carbon dioxide, chlorine, bromine, iodine, chlorotrimethylsilane, styrenyldimethyl chlorosilane, 1,3-propane sultone, caprolactam, N-benzylidene trimethylsilylamide, dimethyl formamide, silicon acetals, 1,5-diazabicyclo[3.1.0]hexane, allyl bromide, allyl chloride, methacryloyl chloride, 3-(dimethylamino)-propyl chloride, N-(benzylidene) trimethylsilylamine, epichlorohydrin, epibromohydrin, and epiiodohydrin.

82. The process of claim 69, wherein said organometallic initiator is selected from the group consisting of omega-(tert-alkoxy)-1-alkyllithiums, omega-(tert-alkoxy)-1-alkyllithiums chain extended with a compound selected from the group consisting of conjugated alkadienes, alkenyl-substituted aromatic compounds, and mixtures thereof, omega-(tert-alkylthio)-1-alkyllithiums, omega-(tert-alkylthio)-1-alkyllithiums chain extended with a compound selected from the group consisting of conjugated alkadienes, alkenylsubstituted aromatic compounds, and mixtures thereof, omega-(tert-butyldimethylsilyloxy)-1-alkyllithiums, omega-(tert-butyldimethylsilylthio)-1-alkyllithiums, omega-(dialkylamino)-1-alkyllithiums, omega-(dialkylamino)-1-alkyllithiums chain-extended with a compound selected from the group consisting of conjugated alkadienes, alkenylsubstituted aromatic compounds, and mixtures thereof, and omega-(bis-tert-alkylsilylamino)-1-alkyllithiums.

83. The process of claim 82, wherein said organometallic initiator is selected from the group consisting of 3-(1,1-dimethylethoxy)-1-propyllithium, 3-(tert-butyldimethylsilyloxy)-1-propyllithium, 3-(1,1-dimethylethylthio)-1-propyllithium, 3-(dimethylamino)-1-propyllithium, 3-(di-tert-butyldimethylsilylamino)-1-propyllithium, 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethypropoxy)-2,2-dimethyl-1-propyllithium, 4-(1,1-dimethypropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium, 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 4-(ethoxy)-1-butyllithium, 4-(propyloxy)-1-butyllithium, 4-(1-methylethoxy)-1-butyllithium, 3-(triphenylmethoxy)-2,2-dimethyl-1-propyllithium, 4-(triphenylmethoxy)-1-butyllithium, 3-[3-(dimethylamino)-1-propyloxy]-1-propyllithium, 3-[2-(dimethylamino)-1-ethoxy]-1-propyllithium, 3-[2-(diethylamino)-1-ethoxy]-1-propyllithium, 3-[2-(diisopropyl)amino)-1-ethoxy]-1-propyllithium, 3-[2-(1-piperidino)-1-ethoxy]-1-propyllithium, 3-[2-(1-pyrrolidino)-1-ethoxy]-1-propyllithium, 4-[3-(dimethylamino)-1-propyloxy]-1-butyllithium, 6-[2-(1-piperidino)-1-ethoxy]-1-hexyllithium, 3-[2-(methoxy)-1-ethoxy]-1-propyllithium, 3-[2-(ethoxy)-1-ethoxy]-1-propyllithium, 4-[2-(methoxy)-1-ethoxy]-1-butyllithium, 5-[2-(ethoxy)-1-ethoxy]-1-pentyllithium, 3-[3-(methylthio)-1-propyloxy]-1-propyllithium, 3-[4-(methylthio)-1-butyloxy]-1-propyllithium, 3-(methylthiomethoxy)-1-propyllithium, 6-[3-(methylthio)-1-propyloxy]-1-hexyllithium, 3-[4-(methoxy)-benzyloxy]-1-propyllithium, 3-[4-(1,1-dimethylethoxy)-benzyloxy]-1-propyllithium, 3-[2,4-(dimethoxy)-benzyloxy]-1-propyllithium, 8-[4-(methoxy)-benzyloxy]-1-octyllithium, 4-[4-(methylthio)-benzyloxy]-1-butyllithium, 3-[4-(dimethylamino)-benzyloxy]-1-propyllithium, 6-[4-(dimethylamino)-benzyloxy]-1-hexyllithium, 5-(triphenylmethoxy)-1-pentyllithium, 6-(triphenylmethoxy)-1-hexyllithium, and 8-(triphenylmethoxy)-1-octyllithium, 3-(hexamethyleneimino)-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium, 6-(t-butyldimethylsilylthio)-1-hexyllithium, 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium, chain extended oligomeric analogs thereof comprising a hydrocarbyl group derived by incorporation of a compound selected from the group consisting of conjugated alkadienes, alkenyl substituted aromatic compounds, and mixtures thereof, and mixtures thereof.

84. The process of claim 71, further comprising copolymerizing said functional group with at least one comonomer after said functionalizing step.

85. The process of claim 84, wherein said comonomer is selected from the group consisting of lactams, cyclic ethers, diamines, diisocyanates, polyisocyanates, diamides, polyamides, cyclic amides, dicarboxylic acids, polycarboxylic acids, diols, polyols, anhydrides and mixtures thereof.

86. A process for preparing a multi-branched or star-shaped polymer, comprising:

polymerizing ethylene singly, as an admixture with an alkenylsubstituted aromatic hydrocarbon, or sequentially with one or more alkenylsubstituted aromatic compound comonomers, with a protected functional organometallic initiator of the formula $$M-Q_n-Z-J-[Y(R^1R^2R^3)]_x \quad \text{(II)}$$

wherein:

M is an alkali metal;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 0 to 5;

Z is a branched or straight chain hydrocarbon group which contains 3–25 carbon atoms, optionally containing aryl or substituted aryl groups;

J is oxygen, sulfur, or nitrogen;

Y is an element selected from Group IVa of the Periodic Table of Elements;

$R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen, to form a mono-protected, mono-functionalized living polymer; and coupling said living polymer with at least one other living polymer with a linking agent.

87. The process of claim 83, wherein said linking agent is selected from the group consisting of halosilanes, halostannanes, phosphorus halides, isomeric dialkenylaryls, isomeric divinylaryls, isomeric trivinylaryls, and mixtures thereof.

88. The process of claim 86, wherein ethylene is sequentially polymerized with one or more alkenylsubstituted aromatic compounds to form a block copolymer.

89. The process of claim 86, wherein each of said comonomer and Q comprises one or more alkenylsubstituted aromatic compounds independently selected from the group consisting of styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene, alkyl, cycloalkyl, aryl, alkylaryl and arylalkyl derivatives thereof in which the total number of carbon atoms in the combined hydrocarbon constituents is not greater than 18, and mixtures thereof.

90. The process of claim 86, wherein each of said comonomer and Q comprises styrene.

91. The process of claim 83, wherein Y is carbon or silicon.

92. The process of claim 83, further comprising after said coupling step the step of saturating at least a portion of aliphatic unsaturation of said polymer with hydrogen.

93. The process of claim 92, wherein said saturating step comprises saturating at least about 90% of aliphatic unsaturation with hydrogen.

94. The process of claim 92, wherein said saturating step comprises saturating aliphatic unsaturation of said polymer prior to deprotecting said polymer.

95. The process of claim 94, further comprising deprotecting said hydrogenated polymer.

96. The process of claim 92, further comprising deprotecting said polymer prior to said saturating step.

97. The process of claim 83, further comprising deprotecting said polymer after said polymerizing step.

98. The process of claim 86, wherein said organometallic initiator is selected from the group consisting of omega-(tert-alkoxy)-1-alkyllithiums, omega-(tert-alkoxy)-1-alkyllithiums chain extended with a compound selected from the group consisting of conjugated alkadienes, alkenyl-substituted aromatic compounds, and mixtures thereof, omega-(tert-alkylthio)-1-alkyllithiums, omega-(tert-alkylthio)-1-alkyllithiums chain extended with a compound selected from the group consisting of conjugated alkadienes, alkenylsubstituted aromatic compounds, and mixtures thereof, omega-(tert-butyldimethylsilyloxy)-1-alkyllithiums, omega-(tert-butyldimethylsilylthio)-1-alkyllithiums, omega-(dialkylamino)-1-alkyllithiums, omega-(dialkylamino)-1-alkyllithiums chain-extended with a compound selected from the group consisting of conjugated alkadienes, alkenylsubstituted aromatic compounds, and mixtures thereof, and omega-(bis-tert-alkylsilylamino)-1-alkyllithiums.

99. The process of claim 98, wherein said organometallic initiator is selected from the group consisting of 3-(1,1-dimethylethoxy)-1-propyllithium, 3-(tert-butyldimethylsilyloxy)-1-propyllithium, 3-(1,1-dimethylethylthio)-1-propyllithium, 3-(dimethylamino)-1-propyllithium, 3-(di-tert-butyldimethylsilylamino)-1-propyllithium, 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium, 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 4-(ethoxy)-1-butyllithium, 4-(propyloxy)-1-butyllithium, 4-(1-methylethoxy)-1-butyllithium, 3-(triphenylmethoxy)-2,2-dimethyl-1-propyllithium, 4-(triphenylmethoxy)-1-butyllithium, 3-[3-(dimethylamino)-1-propyloxy]-1-propyllithium, 3-[2-(dimethylamino)-1-ethoxy]-1-propyllithium, 3-[2-(diethylamino)-1-ethoxy]-1-propyllithium, 3-[2-(diisopropyl)amino]-1-ethoxy]-1-propyllithium, 3-[2-(1-piperidino)-1-ethoxy]-1-propyllithium, 3-[2-(1-pyrrolidino)-1-ethoxy]-1-propyllithium, 4-[3-(dimethylamino)-1-propyloxy]-1-butyllithium, 6-[2-(1-piperidino)-1-ethoxy]-1-hexyllithium, 3-[2-(methoxy)-1-ethoxy]-1-propyllithium, 3-[2-(ethoxy)-1-ethoxy]-1-propyllithium, 4-[2-(methoxy)-1-ethoxy]-1-butyllithium, 5-[2-(ethoxy)-1-ethoxy]-1-pentyllithium, 3-[3-(methylthio)-1-propyloxy]-1-propyllithium, 3-[4-(methylthio)-1-butyloxy]-1-propyllithium, 3-(methylthiomethoxy)-1-propyllithium, 6-[3-(methylthio)-1-propyloxy]-1-hexyllithium, 3-[4-(methoxy)-benzyloxy]-1-propyllithium, 3-[4-(1,1-dimethylethoxy)-benzyloxy]-1-propyllithium, 3-[2,4-(dimethoxy)-benzyloxy]-1-propyllithium, 8-[4-(methoxy)-benzyloxy]-1-octyllithium, 4-[4-(methylthio)-benzyloxy]-1-butyllithium, 3-[4-(dimethylamino)-benzyloxy]-1-propyllithium, 6-[4-(dimethylamino)-benzyloxy]-1-hexyllithium, 5-(triphenylmethoxy)-1-pentyllithium, 6-(triphenylmethoxy)-1-hexyllithium, and 8-(triphenylmethoxy)-1-octyllithium, 3-(hexamethyleneimino)-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium, 6-(t-butyldimethylsilylthio)-1-hexyllithium, 3-(trimethylsilylthio)-2,2-dimethyl-1-propyllithium, 3-(1,1-dimethylethylthio)-1-propyllithium, 3-(1,1- dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium, chain extended oligomeric analogs thereof comprising a hydrocarbyl group derived by incorporation of a compound selected from the group consisting of conjugated alkadienes, alkenyl substituted aromatic compounds, and mixtures thereof, and mixtures thereof.

100. The process of claim 95 or 96, further comprising copolymerizing said polymer with at least one comonomer, with the proviso that when J is reacted with said comonomer, J is O or S.

101. The process of claim 100, wherein said comonomer is selected from the group consisting of lactams, cyclic ethers, diamines, diisocyanates, polyisocyanates, diamides, polyamides, cyclic amides, dicarboxylic acids, polycarboxylic acids, diols, polyols, anhydrides and mixtures thereof.

102. The process of claim 86, wherein said polymerizing step comprises polymerizing ethylene singly, or sequentially or as mixture thereof with one or more alkenylsubstituted aromatic compounds, with at least one protected functional organometallic initiator of Formula (II) and at least one non-functional organometallic initiator to provide a multi-branched or star-shaped copolymer having at least one functional end and at least one non-functional end.

103. The process of claim 86, wherein said polymerizing step comprises polymerizing ethylene singly, or sequentially or as mixture thereof with one or more alkenylsubstituted aromatic compounds, with protected functional organometallic initiators of Formula (II) in which J is different to provide a multi-branched or star-shaped polymer having at least two different functional ends.

104. The process of claim 86, wherein said polymerizing step comprises polymerizing ethylene singly, or sequentially or as mixture thereof with one or more alkenylsubstituted aromatic compounds, with protected functional organometallic initiators of Formula (II) in which $[Y(R^1R^2R^3)]_x$ is different.

105. A process for modifying the surface adhesion properties of polyolefins, comprising melt mixing the functional polymer of claim 1, 14, or 43 with a polyolefin in an amount of 1 to 25% by weight based on the polyolefin.

106. The process of claim 105, wherein the polyolefin is selected from the group consisting of low density polyethylene, linear low density polyethylene, high density polyethylene, polypropylene, polyisobutylene and copolymers and blends thereof.

107. A copolymer having the formula

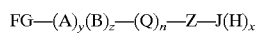

wherein:
FG is H or a protected or non-protected functional group;
each A and B is a hydrocarbyl group, one of which is derived by incorporation of one or more alkenylsubstituted aromatic compounds, and the other of which is derived by incorporation of ethylene;
y and z represent the equivalents of A and B employed, respectively, and are integers from 10 to 200;
Q is a saturated or unsaturated hydrocarbyl group derived by incorporation of a compound selected from the group consisting of conjugated diene hydrocarbons, alkenylsubstituted aromatic compounds, and mixtures thereof;
n is an integer from 0 to 5;
Z is a branched or straight chain hydrocarbon group which contains 3–25 carbon atoms, optionally containing aryl or substituted aryl groups;
J is oxygen, sulfur, or nitrogen; and
x is dependent on the valence of J and varies from one when J is oxygen or sulfur to two when J is nitrogen.

108. A copolymer having the formula

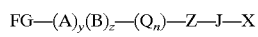

wherein:
FG is H or a protected or non-protected functional group;
each A and B is a hydrocarbyl group, one of which is derived by incorporation of one or more alkenylsubstituted aromatic compounds, and the other of which is derived by incorporation of ethylene;
y and z represent the equivalents of A and B employed, respectively, and are integers from 10 to 200;
Q is a saturated or unsaturated hydrocarbyl group derived by incorporation of a compound selected from the group consisting of conjugated diene hydrocarbons, alkenylsubstituted aromatic compounds, and mixtures thereof;
n is an integer from 0 to 5;
Z is a branched or straight chain hydrocarbon group which contains 3–25 carbon atoms, optionally containing aryl or substituted aryl groups;
J is oxygen, sulfur, or nitrogen; and
X is a polymer segment derived by reaction of a comonomer with J.

109. The copolymer of claim 108, wherein said comonomer is selected from the group consisting of lactams, cyclic ethers, diamines, diisocyanates, polyisocyanates, diamides, polyamides, cyclic amides, dicarboxylic acids, polycarboxylic acids, diols, polyols, anhydrides, and mixtures thereof.

* * * * *

UNITED STATES PATENT AND TRADEMARK OFFICE
CERTIFICATE OF CORRECTION

PATENT NO. : 5,849,847
DATED : December 15, 1998
INVENTOR(S) : Quirk It is certified that error appears in the above-identified patent and that said Letters Patent is hereby corrected as shown below:

Title page, after "[22] Filed: Jul. 29, 1996" insert

--Related U.S. Application Data

[60] Provisional Application No. 60/001,895 August 4, 1995--.

In the References Cited, U.S. PATENT DOCUMENTS, line 1, "3,250,862" should read --3,520,862--.

In the References Cited, FOREIGN PATENT DOCUMENTS, line 3, "0011511" should read --58-11511--.

Column 30, lines 31 and 36, "claim 48", each occurance, should read --claim 51--.

Column 33, lines 25 and 26, "dimethypropoxy", each occurance, should read --dimethylpropoxy--.

Column 35, lines 11, 32, 34 and 47, "claim 83", each occurance, should read --claim 86--.

Column 37, line 51, "claim 1, 14, or 43" should read --claim 1, 11, or 40--.

Signed and Sealed this

Fifth Day of October, 1999

*Attest:*

Q. TODD DICKINSON

*Attesting Officer*    Acting Commissioner of Patents and Trademarks